United States Patent
Kim et al.

(10) Patent No.: US 11,907,601 B2
(45) Date of Patent: *Feb. 20, 2024

(54) DISPLAY DEVICE AND METHOD OF CONTROLLING PLURALITY OF DISPLAY DEVICES

(71) Applicant: Samsung Display Co., Ltd., Yongin-Si (KR)

(72) Inventors: Sung Hoon Kim, Yongin-si (KR); Ok Kyung Park, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,874

(22) Filed: Mar. 13, 2023

(65) Prior Publication Data

US 2023/0214166 A1 Jul. 6, 2023

Related U.S. Application Data

(63) Continuation of application No. 17/734,781, filed on May 2, 2022, now Pat. No. 11,604,619.

(30) Foreign Application Priority Data

Jul. 7, 2021 (KR) ..................... 10-2021-0089261

(51) Int. Cl.
*G06F 3/14* (2006.01)
*G06F 3/044* (2006.01)

(52) U.S. Cl.
CPC .......... *G06F 3/1423* (2013.01); *G06F 3/0446* (2019.05)

(58) Field of Classification Search
CPC .............................. G06F 3/1423; G06F 3/0446
USPC .......................................................... 345/1.1
See application file for complete search history.

(56) References Cited

U.S. PATENT DOCUMENTS

| 9,304,732 B2 * | 4/2016 | Park .................... G06F 3/1431 |
| 10,353,661 B2 | 7/2019 | Choi et al. |
| 2011/0122048 A1 * | 5/2011 | Choi .................... G09G 5/003 345/1.1 |

(Continued)

FOREIGN PATENT DOCUMENTS

| CN | 104202643 A | 12/2014 |
| CN | 110874180 A | 3/2020 |

(Continued)

*Primary Examiner* — Deeprose Subedi
(74) *Attorney, Agent, or Firm* — Innovation Counsel LLP

(57) ABSTRACT

Provided herein may be a display device and a method of controlling a plurality of display devices. The method may include displaying, on a first display device, a first image including a first partial image, a second partial image, and a third partial image, transmitting, by the first display device, a second image including a fourth partial image corresponding to the first partial image, a fifth partial image corresponding to the second partial image, and a sixth partial mage corresponding to the third partial image to a second display device, displaying the second image on the second display device, receiving, by the first display device, a first touch input for a first input interface included in the third partial image, and receiving, by the first display device, a second touch input for at least one of the fourth, fifth partial image, and sixth partial images.

24 Claims, 17 Drawing Sheets

(56) References Cited

U.S. PATENT DOCUMENTS

| | | | | |
|---|---|---|---|---|
| 2012/0013523 A1* | 1/2012 | Jaynes | ............... | G06F 3/1446 |
| | | | | 345/1.3 |
| 2014/0075377 A1 | 3/2014 | Kang et al. | | |
| 2016/0313965 A1 | 10/2016 | Chang et al. | | |

FOREIGN PATENT DOCUMENTS

| CN | 112468863 A | 3/2021 |
|---|---|---|
| KR | 10-1099838 B1 | 12/2011 |
| KR | 10-1648564 B1 | 8/2016 |
| KR | 10-2080146 B1 | 2/2020 |
| KR | 10-2269481 B1 | 6/2021 |

\* cited by examiner

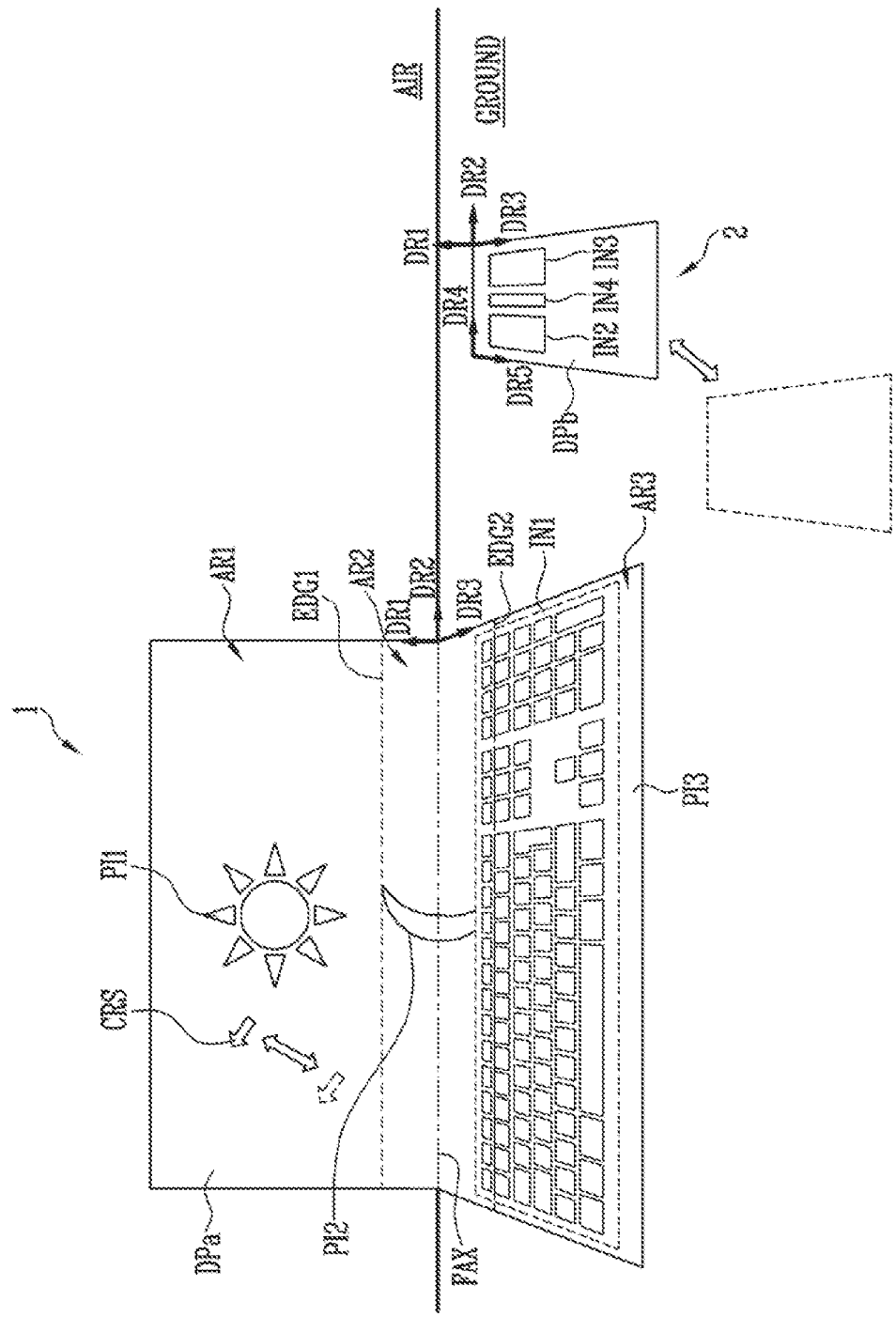

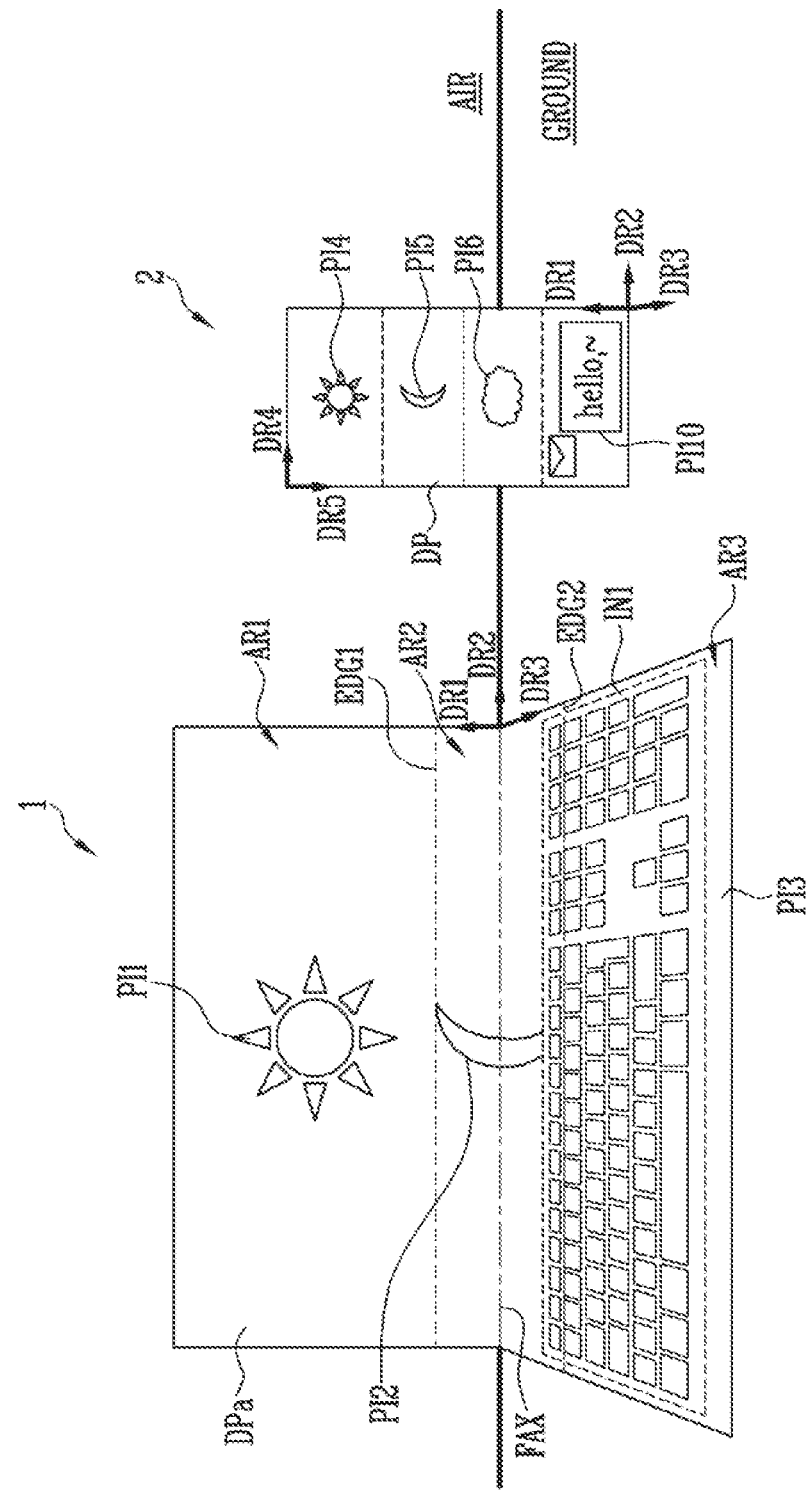

DISPLAY DEVICE AND METHOD OF CONTROLLING PLURALITY OF DISPLAY DEVICES

CROSS-REFERENCE TO RELATED APPLICATION

The present application is a continuation application of U.S. patent application Ser. No. 17/734,781 filed on May 2, 2022, now U.S. Pat. No. 11,604,619, which claims priority to Korean patent application No. 10-2021-0089261 filed on Jul. 7, 2021; the entire contents of which are incorporated herein by reference.

BACKGROUND

1. Technical Field

Various embodiments of the present disclosure relate to a display device and a method of controlling a plurality of display devices.

2. Related Art

With the development of information technology, display devices that connect users to information have grown in importance. Owing to the importance of the display device, the use of different types of display devices, such as a liquid crystal display (LCD) device and an organic light-emitting display device, has increased.

Due to the fact that a display device often includes a touch sensor as an input means, a separate set of mechanical buttons or keyboard is often not necessary, allowing the display screen to be wide. However, when only a method of directly touching the display screen is used, the display device may fall or get dropped, or the location of the display device may change, causing problems. A method of using a touch screen display device while minimizing the above risks is desired.

SUMMARY

Various embodiments of the present disclosure are directed to a display device that enables user input to be made on a foldable touchscreen display device without inconvenience, and a method of controlling a plurality of display devices.

An embodiment of the present disclosure may provide for a method of controlling a plurality of display devices. The method may include displaying, on a first display device, a first image including a first partial image, a second partial image, and a third partial image, the third partial image including a first input interface; transmitting, by the first display device, a second image including a fourth partial image corresponding to the first partial image, a fifth partial image corresponding to the second partial image, and a sixth partial mage corresponding to the third partial image to a second display device; displaying the second image on the second display device; receiving, by the first display device, a first touch input on a first input interface; and receiving, by the first display device, a second touch input on at least one of the fourth partial image, the fifth partial image, and the sixth partial image.

The method may further include transmitting, by the first display device, direction information about a direction in which the first partial image, the second partial image, and the third partial image are arranged on the first display device; and causing the second display device to determine a direction in which the fourth partial image, the fifth partial image, and the sixth partial image are arranged in the second image based on the direction information.

When the second display device switches to a horizontal mode or a vertical mode, a size of the second image may change, but the direction in which the fourth partial image, the fifth partial image, and the sixth partial image are arranged may be unchanged.

Displaying the first image may include displaying the first partial image on a plane defined by a first direction and a second direction and displaying the third partial image on a plane defined by the second direction and a third direction, and displaying the second image comprises displaying the fourth partial image in the first direction from the sixth partial image both in cases where a long side and a short side of a display surface of the second display device are parallel to the first direction and the second direction, respectively and where the long side and the short side are parallel to the second direction and the first direction, respectively.

Displaying the second image may be configured to display the sixth partial image in the third direction from the fourth partial image both in cases where the long side and the short side are parallel to the second direction and the third direction, respectively, and where the long side and the short side are parallel to the third direction and the second direction, respectively.

The first partial image and the fourth partial image may be identical to each other, and the third partial image and the sixth partial image may be at least partially different from each other.

The sixth partial image may include an object different from the first input interface at a location corresponding to the first input interface.

Displaying the first image may be configured to display the first partial image farthest away from a ground and display the third partial image closest to the ground.

The second image may include a second input interface separated from the fourth partial image, the fifth partial image, and the sixth partial image.

When the second input interface is touched, a double-click function or a right-click function of a mouse button may be performed.

When the second image is enlarged, a size of the first image may be unchanged.

The method may further include transmitting, by the first display device, a third image including a seventh partial image corresponding to the first partial image, an eighth partial image corresponding to the second partial image, and a ninth partial mage corresponding to the third partial image to a third display device; displaying, by the third display device, the third image; and receiving, by the first display device, a third touch input for at least one of the seventh partial image, the eighth partial image, and the ninth partial image.

The method may further include displaying, by the first display device, a first point object corresponding to the second touch input; and displaying, by the first display device, a second point object corresponding to the third touch input.

An embodiment of the present disclosure may provide for a display device. The display device may include a display including a first pixel area, a second pixel area contacting the first pixel area at a first edge, and a third pixel area contacting the second pixel area at a second edge; a sensor including a first sensing area configured to at least partially overlap the first pixel area, a second sensing area configured to at least partially overlap the second pixel area, and a third sensing area configured to at least partially overlap the third pixel area, and configured to receive a first touch input; a display driver configured to provide the display with a first image including a first partial image corresponding to the first pixel area, a second partial image corresponding to the second pixel area, and a third partial image corresponding to the third pixel area; and a transceiver configured to transmit a second image including a fourth partial image corresponding to the first partial image, a fifth partial image corresponding to the second partial image, and a sixth partial image corresponding to the third partial image, to a first external display device and to receive a second touch input different from the first touch input from the first external display device.

The first partial image and the fourth partial image may be identical to each other, and the third partial image and the sixth partial image may be at least partially different from each other.

The third partial image may include a first input interface, and the sixth partial image may include an object different from the first input interface at a location corresponding to the first input interface.

The first input interface may be a keyboard.

The third pixel area may be located closer to a ground than the first pixel area.

The display device may further include a direction sensor configured to provide direction information about a direction in which the first partial image, the second partial image, and the third partial image are arranged, wherein the transceiver further transmits the direction information to the first external display device.

The transceiver may be configured to transmit a third image including a seventh partial image corresponding to the first partial image, an eighth partial image corresponding to the second partial image, and a ninth partial image corresponding to the third partial image, to a second external display device and to receive a third touch input different from the first and second touch inputs from the second external display device.

BRIEF DESCRIPTION OF THE DRAWINGS

FIG. 16 is a diagram illustrating the case where the second display device is used as a mouse.

FIG. 17 is a diagram illustrating an embodiment in which the second display device is used.

DETAILED DESCRIPTION

Figure 1:
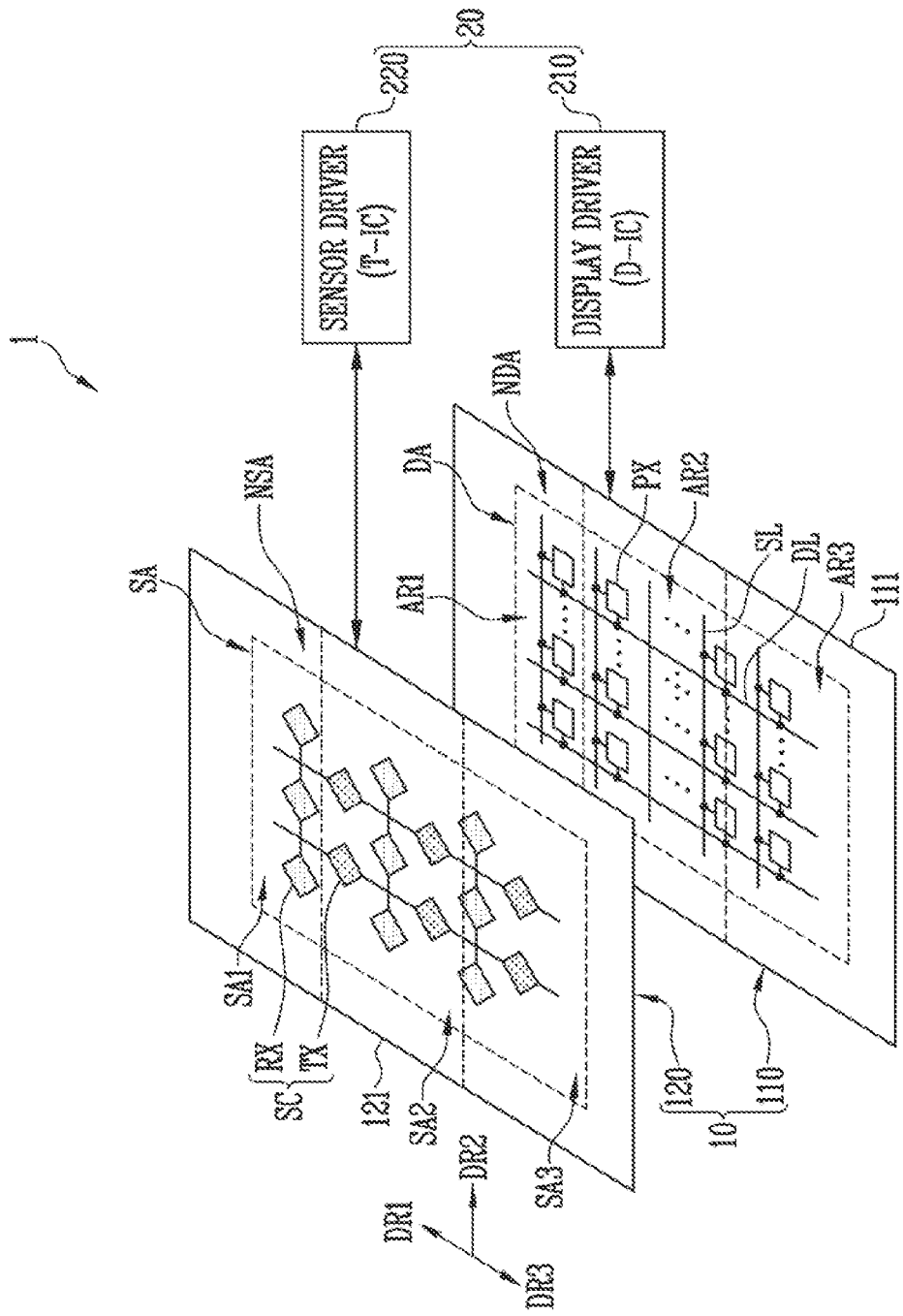
FIG. 1 is a diagram illustrating a display device according to an embodiment of the present disclosure.

Hereinafter, embodiments of the present disclosure will be described in detail with reference to the attached drawings so that those skilled in the art can easily practice the present disclosure. The present disclosure may be embodied in various different forms without being limited to the following embodiments.

Furthermore, in the drawings, portions which are not related to the present disclosure will be omitted to explain the present disclosure more clearly. Reference should be made to the drawings, in which similar reference numerals are used throughout the different drawings to designate similar components. Therefore, reference numerals described in a previous drawing may be used in other drawings.

Further, since the sizes and thicknesses of respective components are arbitrarily indicated in drawings for convenience of description, the present disclosure is not limited by the drawings. The sizes, thicknesses, etc. of components in the drawings may be exaggerated to make the description of a plurality of various layers and areas clear.

Furthermore, in the following description, "the same or identical" may mean "substantially the same or substantially identical". That is, "the same or identical" may mean that a certain element is identical enough for those skilled in the art to understand that the certain element is the same as or identical to an additional element. Other expressions may be expressions from which "substantially" is omitted.

FIG. 1 is a diagram illustrating a display device according to an embodiment of the present disclosure.

Referring to FIG. 1, a display device 1 according to an embodiment of the present disclosure may include a panel 10 and a driver circuit 20 for driving the panel 10.

For example, the panel 10 may include a display 110 for displaying an image and a sensor 120 for sensing a touch, a pressure, a fingerprint, a hovering, or the like. For example, the panel 10 may include pixels PX and sensors SC disposed to overlap at least some of the pixels PX. In an embodiment, the sensors SC may include first sensors TX and second sensors RX. In other embodiments (e.g., in a self-capacitance type), the sensors SC may be composed of single-type of sensors regardless of whether the sensors are the first sensors or second sensors. The driver circuit 20 may include a display driver 210 which drives the display 110, and a sensor driver 220 which drives the sensor 120. For example, the pixels PX may display an image in units of a display frame period. For example, the sensors SC may sense the input of a user in units of a sensing frame period synchronized with the display frame period.

In accordance with an embodiment, the display 110 and the sensor 120 may be separately manufactured, after which they may be arranged and/or coupled to each other so that at least portions thereof overlap each other. Alternatively, in an embodiment, the display 110 and the sensor 120 may be manufactured to be integrated with each other. For example, the sensor 120 may be directly formed on at least one substrate (e.g., upper and/or lower substrates of a display panel, or a thin-film encapsulation layer) forming the display 110, or on other insulating layers or various types of functional layers (e.g., an optical layer or a protective layer) in addition to the at least one substrate.

Meanwhile, although, in FIG. 1, the sensor 120 is illustrated as being disposed on the front surface of the display 110 (e.g., an upper surface on which an image is displayed), the location of the sensor 120 is not limited thereto. For example, in other embodiments, the sensor 120 may be disposed on the rear surface or both surfaces of the display 110. In other embodiments, the sensor 120 may be disposed in an edge area of at least one side of the display 110.

The display 110 may include a display substrate 111 and a plurality of pixels PX formed on the display substrate 111. The pixels PX may be disposed in a display area DA of the display substrate 111.

The display panel 111 may include the display area DA in which an image is displayed and a non-display area NDA formed around the display area DA. In an embodiment, the display area DA may be disposed in a central portion of the display 110, and the non-display area NDA may be disposed in an edge area of the display 110 to enclose the display area DA.

The display substrate 111 may be a rigid or flexible substrate, and the materials or properties thereof are not particularly limited. For example, the display substrate 111 may be a rigid substrate made of glass or reinforced glass, or a flexible substrate formed of a thin film made of plastic or metal.

In the display area DA, scan lines SL, data lines DL, and the pixels PX coupled to the scan lines SL and the data lines DL are arranged. The pixels PX may be selected in response to scan signals, each having a turn-on level, supplied from the scan lines SL, may be supplied with data signals from the data lines DL, and may emit light having luminance corresponding to the data signals. By means of this process, an image created by the data signals is displayed in the display area DA. In the present disclosure, the structure of the pixels PX and methods of driving the pixels PX are not particularly limited. For example, each of the pixels PX may be implemented as a pixel based on any of various structures and/or driving methods which are currently known.

Various lines and/or internal circuits which are coupled to the pixels PX of the display area DA may be disposed in the non-display area NDA. For example, a plurality of lines for supplying various types of power and control signals to the display area DA may be disposed in the non-display area NDA, and a scan driver and the like may be further disposed therein.

In the present disclosure, the type of the display 110 is not particularly limited. For example, the display 110 may be implemented as a self-emissive display panel such as an organic light-emitting display (OLED) panel. However, when the display 110 is implemented in a self-emissive type, each pixel is not necessarily limited to the case where only an organic light-emitting element is included in the pixel. For example, the light-emitting element of each pixel may be implemented as an organic light-emitting diode, an inorganic light-emitting diode, a quantum dot/well light-emitting diode, or the like. In each pixel, a plurality of light-emitting elements may be provided. Here, the plurality of light-emitting elements may be connected in series, parallel, or series/parallel to each other. Alternatively, the display 110 may be implemented as a non-emissive display panel such as a liquid crystal display (LCD) panel. When the display 110 is implemented in a non-emissive type, the display device 1 may be additionally provided with a light source, such as a backlight unit.

The display 110 may include a first pixel area AR1, a second pixel area AR2 contacting the first pixel area AR1 at a first edge, and a third pixel area AR3 contacting the second pixel area AR2 at a second edge. The first pixel area AR1 may be located in a first direction DR1 from the second pixel area AR2. The third pixel area AR3 may be located in a third direction DR3 from the second pixel area AR2. When the display 110 is in a flat state, the first direction DR1 may be opposite to the third direction DR3.

The sensor 120 may include a sensor substrate 121 and a plurality of sensors SC formed on the sensor substrate 121. The sensors SC may be disposed in a sensing area SA on the sensor substrate 121.

The sensor substrate 121 may include the sensing area SA in which touch input or the like can be sensed, and a non-sensing area NSA around the sensing area SA. In an embodiment, the sensing area SA may be disposed to overlap at least a portion of the display area DA. For example, the sensing area SA may be set to an area corresponding to the display area DA (e.g., an area overlapping the display area DA), and the non-sensing area NSA may be set to an area corresponding to the non-display area NDA (e.g., an area overlapping the non-display area NDA). In this case, when touch input or the like is provided on the display area DA, the touch input may be detected through the sensor 120.

The sensor substrate 121 may be a rigid or flexible substrate, and may be formed of at least one insulating layer in addition to the rigid or flexible substrate. Further, the sensor substrate 121 may be, but is not limited to, a transparent or translucent light-transmitting substrate. That is, in the present disclosure, the materials and the properties of the sensor substrate 121 are not particularly limited. For example, the sensor substrate 121 may be a rigid substrate made of glass or reinforced glass, or a flexible substrate formed of a thin film made of plastic or metal. Further, in accordance with an embodiment, at least one substrate forming the display 110 (e.g., the display substrate 111, an encapsulation substrate and/or a thin film encapsulation layer), or at least one insulating layer or functional layer disposed inside the display 110 and/or disposed on the outer surface of the display 110 may be used as the sensor substrate 121.

The sensing area SA may be set to an area which can react to the touch input (i.e., an active area of the sensor). For this operation, in the sensing area SA, sensors SC for sensing touch input or the like may be disposed. In accordance with an embodiment, the sensors SC may include the first sensors TX and the second sensors RX.

For example, each of the first sensors TX may extend in the first direction DR1. The first sensors TX may be arranged in the second direction DR2. The second direction DR2 may be different from the first direction DR1. For example, the second direction DR2 may be a direction orthogonal to the first direction DR1. In an embodiment, the directions in which the first sensors TX extend and are arranged may comply with other conventional configurations. Each of the first sensors TX may have a shape in which first cells having a relatively large area and first bridges having a relatively small area are coupled to each other. In FIG. 1, although each of the first cells is illustrated as having a diamond shape, it may be configured in any of various conventional shapes, such as a circular shape, a rectangular shape, a triangular shape, and a mesh shape. For example, the first bridges may be formed to be integrated with the first cells on the same layer as the first cells. In other embodiments, the first bridges may be formed on the layer different from that of the first cells to electrically connect adjacent first cells to each other.

For example, each of the second sensors RX may extend in the second direction DR2. The second sensors RX may be arranged in the first direction DR1. In an embodiment, the directions in which the second sensors RX extend and are arranged may comply with other conventional configurations. Each of the second sensors RX may have a shape in which second cells having a relatively large area and second bridges having a relatively small area are coupled to each other. In FIG. 1, although each of the second cells is illustrated as having a diamond shape, it may be configured in any of various conventional shapes, such as a circular shape, a rectangular shape, a triangular shape, and a mesh shape (mesh form). For example, the second bridges may be formed to be integrated with the second cells on the same layer as the second cells. In other embodiments, the second bridges may be formed on the layer different from that of the second cells to electrically connect adjacent second cells to each other.

In accordance with an embodiment, the first sensors TX and the second sensors RX may include at least one of a metal material, a transparent conductive material, and various additional conductive materials, thus having conductivity. For example, the first sensors TX and the second sensors RX may include at least one of various metal materials such as gold (Au), silver (Ag), aluminum (Al), molybdenum (Mo), chrome (Cr), titanium (Ti), nickel (Ni), neodymium (Nd), copper (Cu), and platinum (Pt), or an alloy of the metal materials. Here, the first sensors TX and the second sensors RX may be configured in a mesh shape. Further, the first sensors TX and the second sensors RX may include at least one of various transparent conductive materials such as silver nanowires (AgNW), indium tin oxide (ITO), indium zinc oxide (IZO), indium gallium zinc oxide (IGZO) antimony zinc oxide (AZO), indium tin zinc oxide (ITZO), zinc oxide (ZnO), tin oxide ($SnO_2$), carbon nanotube, and graphene. In addition, the first sensors TX and the second sensors RX may include at least one of various conductive materials, thus having conductivity. Also, each of the first sensors TX and the second sensors RX may be implemented as a single-layer structure or a multi-layer structure, and the structure of the cross-section thereof is not particularly limited.

Meanwhile, in the non-sensing area NSA of the sensor 120, sensor lines for electrically connecting the sensors TX and RX to the sensor driver 220 or the like may be intensively arranged.

The sensing area SA of the sensor 120 may include a first sensing area SA1 which at least partially overlaps the first pixel area AR1, a second sensing area SA2 which at least partially overlaps the second pixel area AR2, and a third sensing area SA3 which at least partially overlaps the third pixel area AR3. The first sensing area SA1 may be located in the first direction DR1 from the second sensing area SA2. The third sensing area SA3 may be located in the third direction DR3 from the second sensing area SA2. When the sensor 120 is in a flat position, the first direction DR1 may be a direction opposite to the third direction DR3. The sensor 120 may receive first touch input from the user.

The driver circuit 20 may include the display driver 210 which drives the display 110, and the sensor driver 220 which drives the sensor 120. In an embodiment, the display driver 210 and the sensor driver 220 may be configured as separate integrated circuit (IC) chips. In an embodiment, at least portions of the display driver 210 and the sensor driver 220 may be integrated into a single IC.

The display driver 210 may be electrically connected to the display 110, and may then drive the pixels PX. For example, the display driver 210 may include a data driver 12 and a timing controller 11, and a scan driver 13 may be separately mounted in the non-display area NDA of the display 110 (see FIG. 3). In an embodiment, the display driver 210 may include all or some of the data driver 12, the timing controller 11, and the scan driver 13. Display driver 210, data driver 12, timing controller 11, and scan driver 13 are well-known parts that are commercially available, and thus no detailed descriptions are provided herein.

The display driver 210 may provide a first image including a first partial image to be presented in the first pixel area AR1, a second partial image to be presented in the second pixel area AR2, and a third partial image to be presented in the third pixel area AR3 to the display 110.

The sensor driver 220 may be electrically connected to the sensor 120, and may then drive the sensor 120. The sensor driver 220 may include a sensor transmitter and a sensor receiver. In accordance with an embodiment, although the sensor transmitter and the sensor receiver may be integrated into a single IC, they are not limited thereto.

Figure 2:
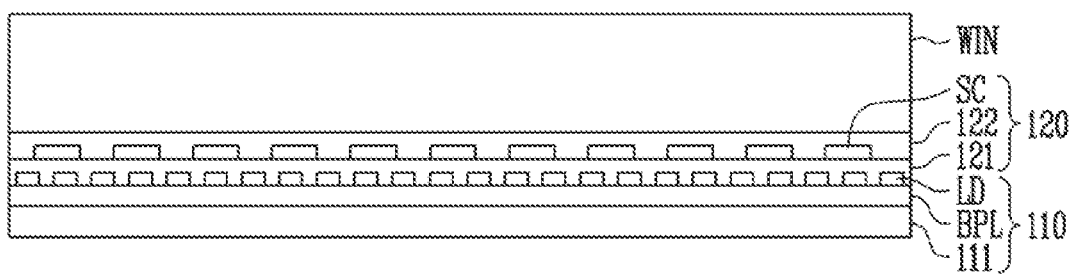
FIG. 2 is a diagram illustrating an embodiment of a stacked structure of the display device of FIG. 1.

FIG. 2 is a diagram illustrating an embodiment of a stacked structure of the display device of FIG. 1.

Referring to FIG. 2, the sensor 120 may be stacked on the top of the display 110, and a window WIN may be stacked on the top of the sensor 120.

The display 110 may include a display substrate 111, a circuit element layer BPL formed on the display substrate 111, and light-emitting elements LD formed on the circuit element layer BPL. The circuit element layer BPL may include pixel circuits for driving the light-emitting elements LD of the pixels PX, scan lines SL, data lines DL, etc.

The sensor 120 may include a sensor substrate 121, sensors SC formed on a sensor substrate 121, and a protective layer 122 configured to cover the sensors SC. In an embodiment of FIG. 2, the sensor substrate 121 is illustrated in the shape of an encapsulation layer configured to cover the pixels PX. In an embodiment, the sensor substrate 121 may be present separately from the encapsulation layer configured to cover the pixels PX.

The window WIN may be a protective element disposed on the uppermost portion of a module for the display device 1, and may be a substantially transparent light-transmitting substrate. Such a window WIN may have a multi-layer structure having layers selected from among a glass substrate, a plastic film, and a plastic substrate. The window WIN may include a rigid or flexible material, and the material used to form the window WIN is not especially limited.

Although not illustrated in the drawings, the display device 1 may further include a polarizing plate (or an anti-reflective layer) for preventing reflection of external light between the window WIN and the sensor 120.

Figure 3:
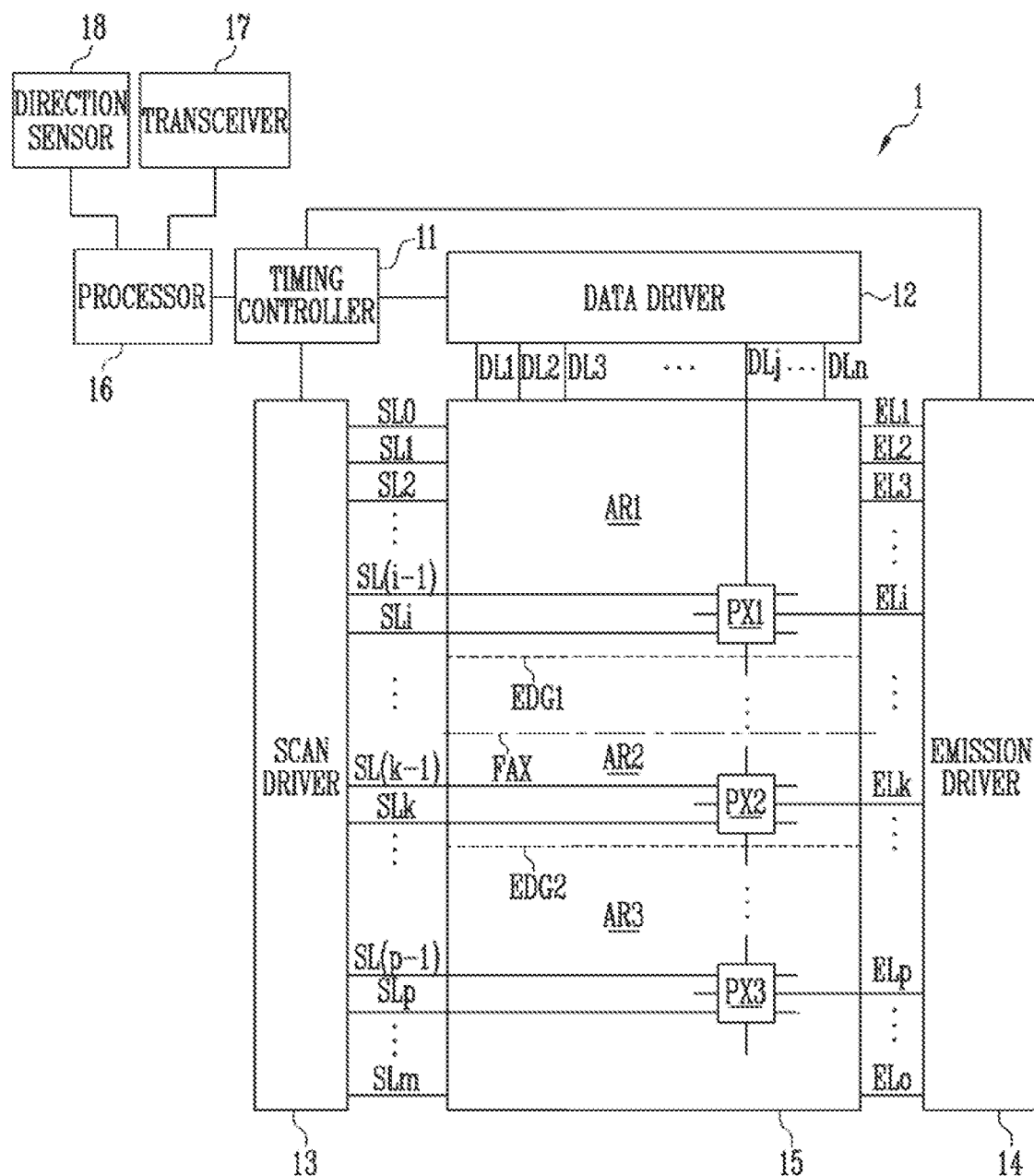
FIG. 3 is a diagram illustrating in detail a display, a display driver, etc. of a display device according to an embodiment of the present disclosure.

FIG. 3 is a diagram illustrating in detail a display, a display driver, etc. of a display device according to an embodiment of the present disclosure.

Referring to FIG. 3, the display device 1 according to an embodiment of the present disclosure may include a timing controller 11, a data driver 12, a scan driver 13, an emission driver 14, a pixel component 15, a processor 16, a transceiver 17, and a direction sensor 18. Timing controller 11, data driver 12, scan driver 13, emission driver 14, pixel component 15, processor 16, transceiver 17, and direction sensor 18 are all well-known parts and their detailed descriptions are omitted.

The timing controller 11 may receive grayscale values for each image frame and control signals from the processor 16. The timing controller 11 may provide the data driver 12, the scan driver 13, the emission driver 14, etc. with control signals suitable for respective specifications thereof so as to display an image corresponding to each image frame.

The timing controller 11 may render grayscale values to meet specifications of the pixel component 15. For example, an external processor may provide a red grayscale value, a green grayscale value, and a blue grayscale value for each unit dot. For example, when the pixel component 15 has a PenTile™ structure, adjacent unit dots share pixels with each other, and thus pixels may not correspond to respective grayscale values in one-to-one correspondence. In this case, rendering of grayscale values is required. When pixels correspond to respective pixel values in one-to-one correspondence, rendering of grayscale values may not be required.

The grayscale values that are rendered or not rendered may be provided to the data driver 12. The data driver 12 may generate data voltages to be provided to data lines DL1, DL2, DL3, . . . , DLj, . . . , DLn using the grayscale values and the control signals. For example, the data driver 12 may sample the grayscale values using a clock signal, and may apply data voltages corresponding to the grayscale values to the data lines DL1 to DLn in units of pixel rows (e.g., pixels coupled to the same scan line(s)). Here, j and n may be integers greater than 0.

The scan driver 13 may receive the clock signal, a scan start signal, etc. from the timing controller 11, and may then generate scan signals to be provided to scan lines SL0, SL1, SL2, . . . , SL(i−1), SLi, . . . , SL(k−1), SLk, . . . , SL(p−1), SLp, . . . , SLm. Here, i, k, p, and m may be integers greater than 0. Here, k may be an integer greater than i, p may be an integer greater than k, and m may be an integer greater than p.

The scan driver 13 may sequentially provide scan signals, each having a turn-on level pulse, to the scan lines SL0 to SLm. The scan driver 13 may include scan stages configured in the form of a shift register. The scan driver 13 may generate scan signals in a manner in which a scan start signal having the form of a turn-on level pulse is sequentially transferred to a next scan stage, under the control of the clock signal.

The first scan lines SL0 to SLi may be coupled to first pixels PX1 of a first pixel area AR1. The second scan lines SL(k−1) and SLk may be coupled to second pixels PX2 of a second pixel area AR2. The third scan lines SL(p−1), SLp, . . . , SLm may be coupled to third pixels PX3 of a third pixel area AR3.

The emission driver 14 may receive the clock signal, an emission stop signal, etc. from the timing controller 11, and may then generate emission signals to be provided to emission lines EL1, EL2, EL3, . . . , ELi, . . . , ELk, . . . , ELp, . . . , ELo. Here, o may be an integer greater than 0, and o may be an integer greater than p. For example, the emission driver 14 may sequentially provide emission signals, each having a turn-off level pulse, to the emission lines EL1 to ELo. For example, each emission stage of the emission driver 14 may be configured in the form of a shift register, and may generate emission signals in a manner in which the emission stop signal having the form of a turn-off level pulse is sequentially transferred to a next emission stage, under the control of the clock signal. In other embodiments, depending on the circuit configuration of the pixels PX1, PX2, and PX3, the emission driver 14 may be omitted.

The pixel component 15 may include the first pixel area AR1, the second pixel area AR2, and the third pixel area AR3. The first pixel area AR1 may include the first pixels PX1 coupled to the data line DLj and the first scan lines SL0 to SLi. The second pixel area AR2 may contact the first pixel area AR1 at a first edge EDG1, and may include second pixels PX2 coupled to the data line DLj and the second scan lines SL(k−1) and SLk. The third pixel area AR3 may contact the second pixel area AR2 at a second edge EDG2, and may include third pixels PX3 coupled to the data line DLj and the third scan lines.

Respective pixels PX1, PX2, and PX3 may be selectively coupled to data lines, scan lines, and emission lines. In other embodiments, when the emission driver 14 is omitted, the pixels PX1, PX2, and PX3 may not be coupled to the emission lines EL1 to ELo.

A folding axis FAX may be disposed between the first edge EDG1 and the second edge EDG2. The folding axis FAX may overlap the second pixel area AR2. That is, when the display device 1 is folded, the second pixel area AR2 may be folded. Here, the first pixel area AR1 and the third pixel area AR3 may remain in a flat state (flat position). The second pixel area AR2 may also be referred to as a "folding area".

Figure 6:
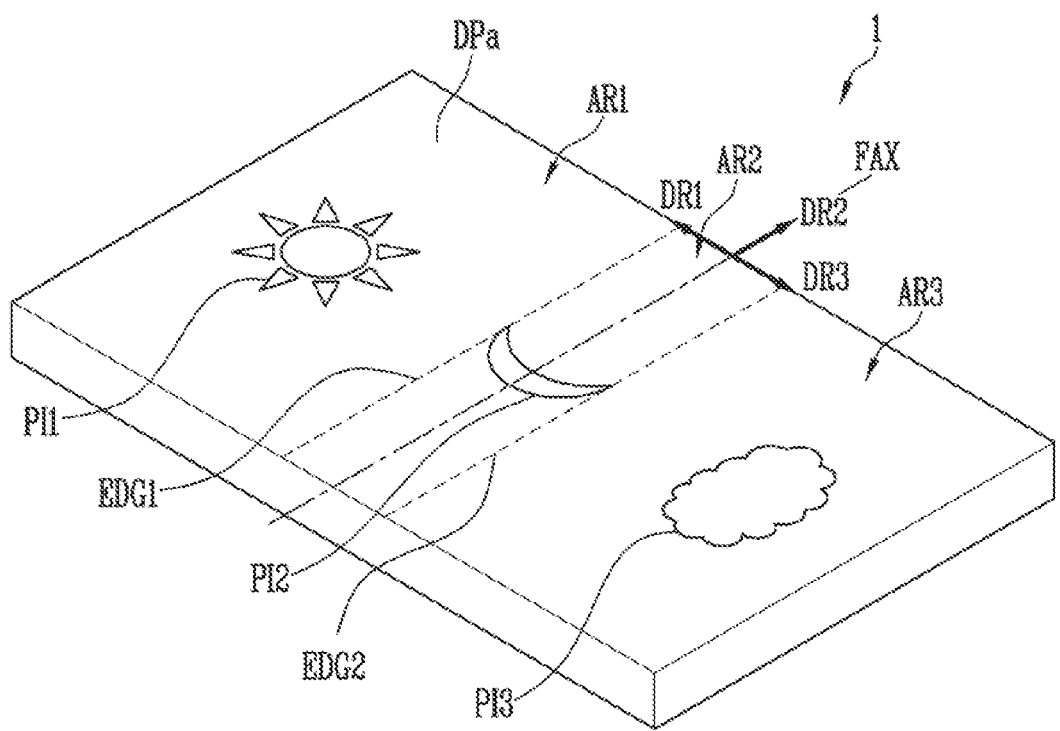
FIGS. 6 to 8 are diagrams illustrating folded states of a display device.

In an embodiment, the folding axis FAX may be physically defined. For example, the display device 1 may further include a mechanical component such as a hinge, thus enabling the display device 1 to be folded or unfolded only with respect to the folding axis FAX. In this configuration, the folding axis FAX may be fixed. Here, the pixel areas AR1, AR2, and AR3 may be fixed areas. In other embodiments, the display device 1 may be configured such that a mount for covering the display panel is flexible. In this case, the folding axis FAX may be located somewhere other than what is shown in FIG. 6. When the location of the folding axis FAX changes, the pixel areas AR1, AR2, and AR3 may change accordingly. In this case, the display device 1 may further include a pressure sensor, a flex sensor, a resistance sensor, etc. (which are well-known parts) so as to detect the folding axis FAX.

In FIG. 1, in order to compare locations, the first pixel PX1, the second pixel PX2, and the third pixel PX3 are illustrated as being coupled to the same data line DLj. However, the first pixel PX1, the second pixel PX2, and the third pixel PX3 may be coupled to different data lines.

The processor 16 may correspond to at least one of a graphics processing unit (GPU), a central processing unit (CPU), an application processor (AP), etc. Meanwhile, the processor 16 may further include additional circuit elements for controlling the transceiver 17 and the direction sensor 18.

The transceiver 17 may transmit and receive data to and from an external display device other than the display device 1. Therefore, the display device 1 may communicate with the external display device through the transceiver 17. As a communication protocol, at least one of existing wireless communication protocols and wired communication protocols may be applied. For example, when the wireless communication protocols are used, the transceiver 17 may include an antenna. For example, when the wired communication protocols are used, the transceiver 17 may include a universal serial bus (USB) port.

For example, the transceiver 17 may transmit a second image including a fourth partial image corresponding to the first partial image, a fifth partial image corresponding to the second partial image, and a sixth partial image corresponding to the third partial image to a first external display device, and may receive second touch input, which is different from first touch input, from the first external display device. A partial image "corresponding to" another partial image is intended to indicate that there is a relationship between the two partial images. The relationship may be, but is not limited to, one partial image representing the other partial image on a different display surface.

Meanwhile, the transceiver 17 may transmit a third image including a seventh partial image corresponding to the first partial image, an eighth partial image corresponding to the second partial image, and a ninth partial image corresponding to the third partial image to a second external display device, and may receive third touch input, which is different from the first and second touch inputs, from the second external display device.

The direction sensor 18 may generate direction information of the display device 1. For example, the direction sensor 18 may include at least one of an acceleration sensor, a gyro sensor, and a geomagnetic sensor. The configuration of the direction sensor 18 may comply with the configuration of an existing sensor.

When the direction information output from the direction sensor 18 is referenced or such direction information is processed, information about the orientation (e.g., north, east, or the like) of each of the first to third pixel areas AR1, AR2, and AR3, and information about which one of the first to third pixel areas AR1, AR2, and AR3 is close to a ground surface, that is, a horizontal surface (e.g., tabletop), may be known. Therefore, the direction sensor 18 may provide direction information about a direction in which the first partial image, the second partial image, and the third partial image are arranged. For example, referring to the direction information, it may be seen that the first partial image is displayed farthest away from the ground surface, and the third partial image is displayed closest to the ground surface. The transceiver 17 may transmit the direction information to the first external display device or the second external display device.

Figure 4:
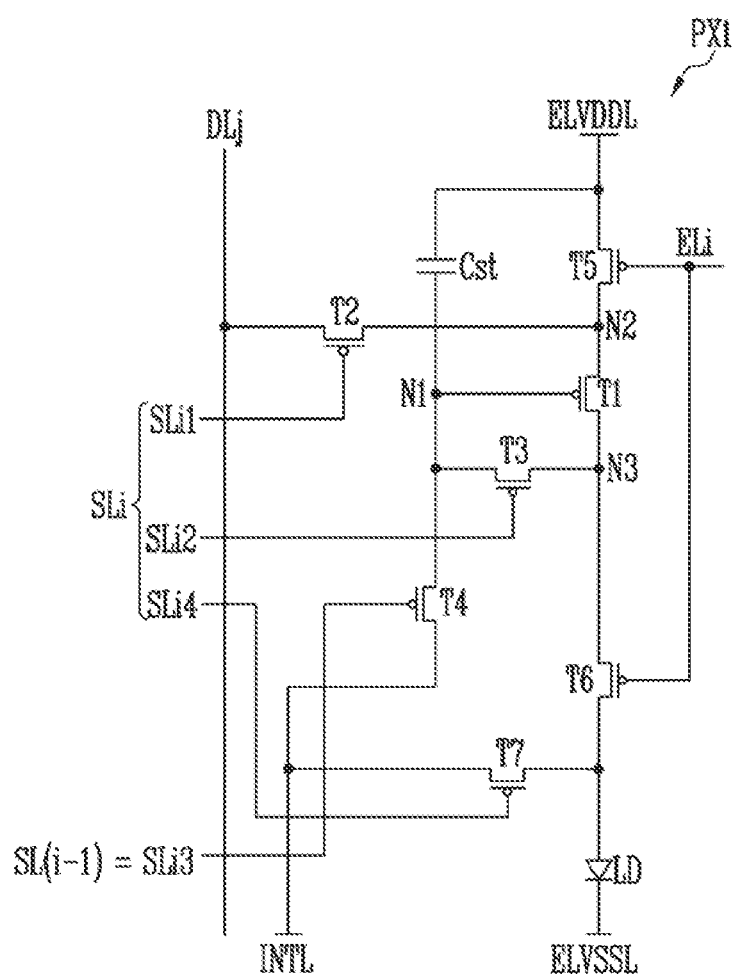
FIG. 4 is a diagram illustrating a pixel according to an embodiment of the present disclosure.

FIG. 4 is a diagram illustrating a pixel according to an embodiment of the present disclosure.

Referring to FIG. 4, a pixel PX1 may include transistors T1, T2, T3, T4, T5, T6, and T7, a storage capacitor Cst, and a light-emitting element LD.

Hereinafter, a circuit configured using P-type transistors will be described as an example. However, those skilled in the art will appreciate that it is possible to design a circuit configured using N-type transistors by varying the polarity of a voltage that is applied to gate terminals of the transistors. Similarly, those skilled in the art will appreciate that it is possible to design a circuit using a combination of P-type transistors and N-type transistors. The term "P-type transistor" commonly denotes a transistor through which the amount of current increases as a voltage difference between a gate electrode and a source electrode increases in a negative direction. The term "N-type transistor" commonly denotes a transistor through which an amount of current increases as a voltage difference between a gate electrode and a source electrode increases in a positive direction. Each transistor may be implemented as any of various types of transistors, such as a thin film transistor (TFT), a field effect transistor (FET), and a bipolar junction transistor (BJT).

The first transistor T1 may have a gate electrode coupled to a first node N1, a first electrode coupled to a second node N2, and a second electrode coupled to a third node N3. The first transistor T1 may be referred to as a driving transistor.

The second transistor T2 may have a gate electrode coupled to a scan line SLi1, a first electrode coupled to a data line DLj, and a second electrode coupled to the second node N2. The second transistor T2 may be referred to as a scan transistor.

The third transistor T3 may have a gate electrode coupled to a scan line SLi2, a first electrode coupled to the first node N1, and a second electrode coupled to the third node N3. The third transistor T3 may be referred to as a diode-connected transistor.

The fourth transistor T4 may have a gate electrode coupled to a scan line SLi3, a first electrode coupled to the first node N1, and a second electrode coupled to an initialization line INTL. The fourth transistor T4 may be referred to as a gate initialization transistor.

The fifth transistor T5 may have a gate electrode coupled to an i-th emission line ELi, a first electrode coupled to a first power line ELVDDL, and a second electrode coupled to the second node N2. The fifth transistor T5 may be referred to as a light-emitting transistor. In an embodiment, the gate electrode of the fifth transistor T5 may be coupled to another emission line.

The sixth transistor T6 may have a gate electrode coupled to the i-th emission line ELi, a first electrode coupled to the third node N3, and a second electrode coupled to an anode of the light-emitting element LD. The sixth transistor T6 may be referred to as a light-emitting transistor. In an embodiment, the gate electrode of the sixth transistor T6 may also be coupled to an emission line other than the emission line coupled to the gate electrode of the fifth transistor T5.

The seventh transistor T7 may have a gate electrode coupled to a scan line SLi4, a first electrode coupled to the initialization line INTL, and a second electrode coupled to the anode of the light-emitting element LD. The seventh transistor T7 may be referred to as a light-emitting element initialization transistor.

The first electrode of the storage capacitor Cst may be coupled to the first power line ELVDDL, and the second electrode thereof may be coupled to the first node N1.

The light-emitting element LD may have an anode coupled to the second electrode of the sixth transistor T6 and a cathode coupled to a second power line ELVSSL. The light-emitting element LD may be a light-emitting diode. The light-emitting element LD may be implemented as an organic light-emitting diode, an inorganic light-emitting diode, a quantum dot/well light-emitting diode, or the like. The light-emitting element LD may emit light in any one of a first color, a second color, and a third color. Although, in the present embodiment, only a single light-emitting element LD is provided in each pixel, a plurality of light-emitting elements may be provided in each pixel. Here, the plurality of light-emitting elements may be connected in series, parallel, or series/parallel to each other.

A first supply voltage may be applied to the first power line ELVDDL, a second supply voltage may be applied to the second power line ELVSSL, and an initialization voltage may be applied to the initialization line INTL. For example, the first supply voltage may be greater than the second supply voltage. For example, the initialization voltage may be equal to or greater than the second supply voltage. For example, the initialization voltage may correspond to a data voltage having the smallest magnitude, among possible data voltages. In an embodiment, the magnitude of the initialization voltage may be smaller than those of the possible data voltages.

Figure 5:
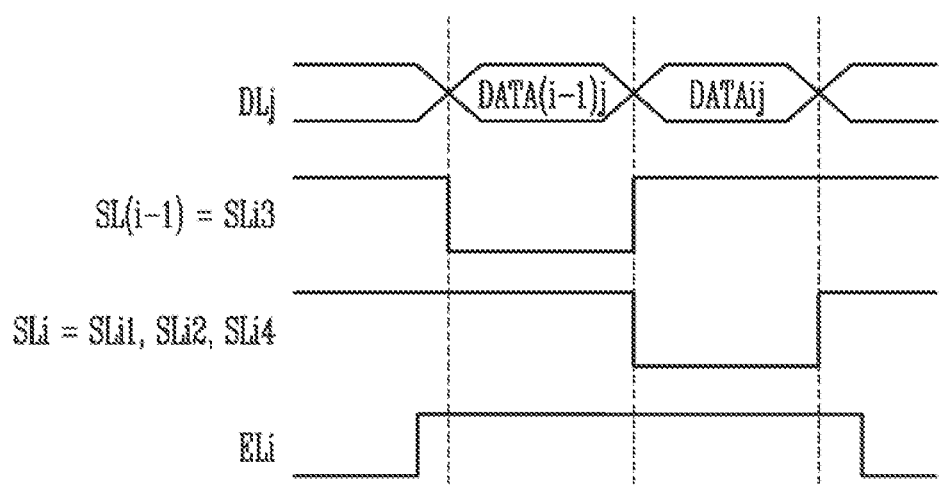
FIG. 5 is a diagram illustrating an embodiment of a method of driving the pixel of FIG. 4.

FIG. 5 is a diagram illustrating an embodiment of a method of driving the pixel of FIG. 4.

Hereinafter, the case where scan lines SLi1, SLi2, and SLi4 are i-th scan lines SLi and the scan line SLi3 is an i−1-th scan line SL(i−1) is assumed for convenience of description. However, the scan lines SLi1, SLi2, SLi3, and SLi4 may have various coupling relationships depending on embodiments. For example, the scan line SLi4 may be an i−1-th scan line or an i+1-th scan line.

First, a data voltage DATA(i−1)j for a i−1-th pixel is applied to the data line DLj and a scan signal having a turn-on level (e.g., a logic low level) is applied to the scan line SLi3.

Here, because a scan signal having a turn-off level (e.g., a logic high level) is applied to the scan lines SLi1 and SLi2, the second transistor T2 remains turned-off, and the data voltage DATA(i−1)j for the i−1-th pixel is prevented from flowing into the pixel PX1.

Here, because the fourth transistor T4 is turned on, the first node N1 is coupled to the initialization line INTL, and thus the voltage of the first node N1 is initialized. Since an emission signal having a turn-off level is applied to the emission line ELi, the transistors M5 and M6 are turned off, and unnecessary light emission on the light-emitting element LD attributable to a procedure for applying the initialization voltage is prevented.

Next, a data voltage DATAij for an i-th pixel PXij is applied to the data line DLj, and a scan signal having a turn-on level is applied to the scan lines SLi1 and SLi2. Accordingly, the transistors T2, T1, and T3 are turned on, and then the data line DLj is electrically connected to the first node N1. Therefore, a compensation voltage obtained by subtracting the threshold voltage of the first transistor T1 from the data voltage DATAij is applied to the second electrode (i.e., the first node N1) of the storage capacitor Cst, and the storage capacitor Cst maintains a voltage corresponding to the difference between the first supply voltage and the compensation voltage. This period may be referred to as a threshold voltage compensation period.

Also, when the scan line SLi4 is an i-th scan line, the seventh transistor T7 is turned on, and thus the anode of the light-emitting element LD is coupled to the initialization line INTL, and the light-emitting element LD is initialized to the amount of charge corresponding to a voltage difference between the initialization voltage and the second supply voltage.

Thereafter, when an emission signal having a turn-on level is applied to the emission line ELi, the transistors T5 and T6 may be turned on. Therefore, a driving current path which couples the first power line ELVDDL, the fifth transistor T5, the first transistor T1, the sixth transistor T6, the light-emitting element LD, and the second power line ELVSSL to each other is formed.

The amount of driving current flowing through the first electrode and the second electrode of the first transistor T1 is controlled depending on the voltage maintained in the storage capacitor Cst. The light-emitting element LD emits light with luminance corresponding to the amount of driving current. The light-emitting element LD emits light until an emission signal having a turn-off level is applied to the emission line ELi.

Figure 7:
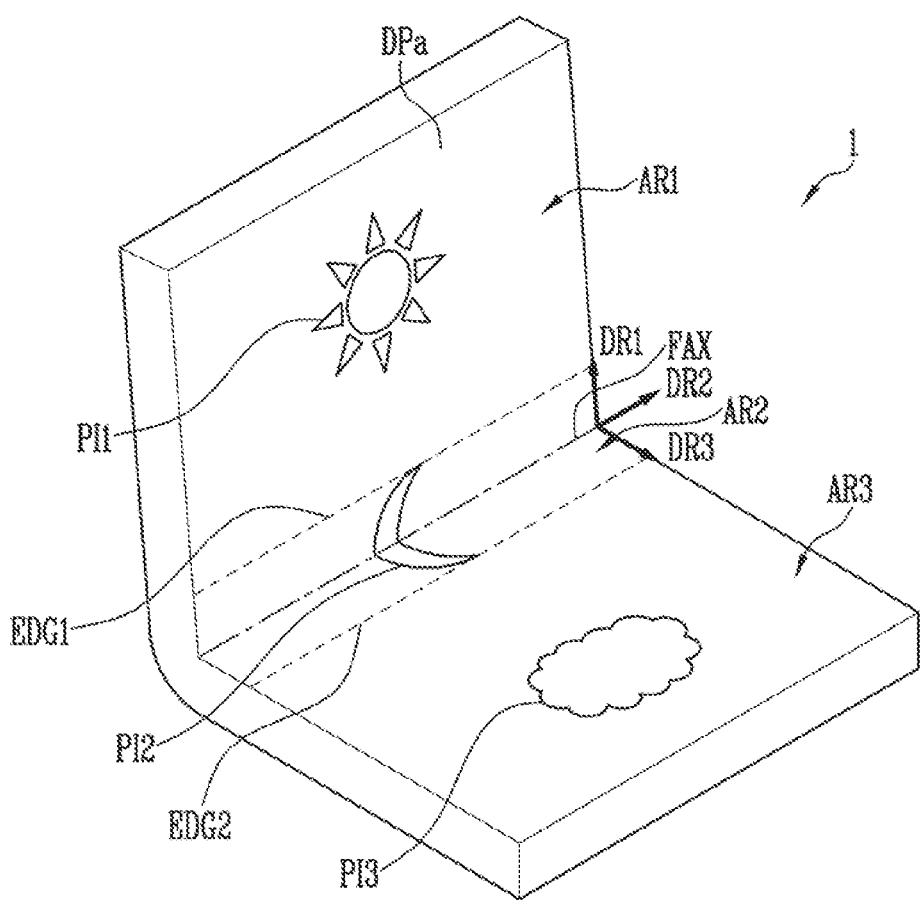
Figure 8:
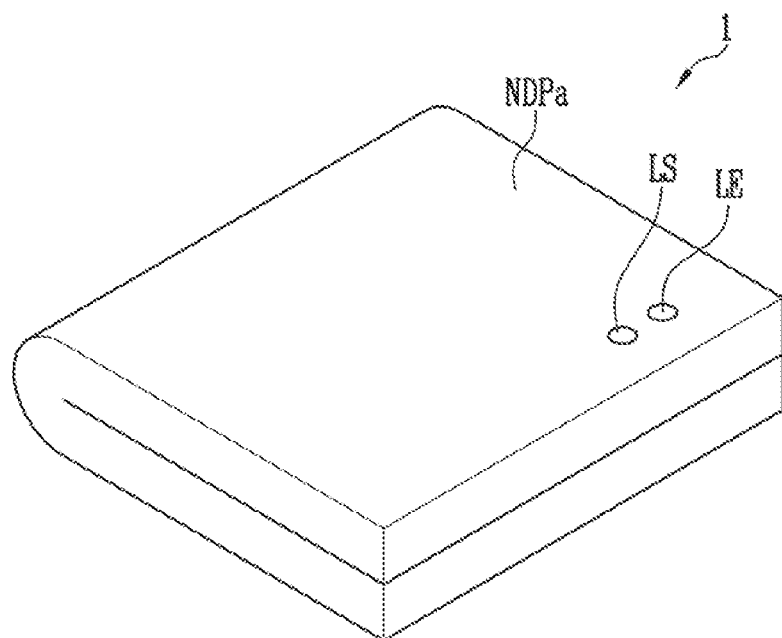

FIGS. 6 to 8 are diagrams illustrating folded states of a display device.

Referring to FIG. 6, the display device 1 is in an unfolded state.

As described above, the display 110 may include a first pixel area AR1, a second pixel area AR2 contacting the first pixel area AR1 at a first edge EDG1, and a third pixel area AR3 contacting the second pixel area AR2 at a second edge EDG2.

The first pixel area AR1 and the second pixel area AR2 may be arranged along a first direction DR1. The first pixel area AR1 may be located on a plane defined by the first direction DR1 and a second direction DR2. Therefore, a first partial image PI1 may be displayed on the plane defined by the first direction DR1 and the second direction DR2. The first direction DR1 and the second direction DR2 may be orthogonal to each other.

The third pixel area AR3 and the second pixel area AR2 may be arranged along a third direction DR3 which, in the unfolded state depicted in FIG. 6, is parallel to the first direction DR1 but in opposite direction. The third pixel area AR3 may be located on a plane defined by the second direction DR2 and the third direction DR3. Therefore, a third partial image PI3 may be displayed on the plane defined by the second direction DR2 and the third direction DR3. The second direction DR2 and the third direction DR3 may be orthogonal to each other.

The relationship between the first direction DR1 and the third direction DR3 may vary depending on the folded state of the display device 1. In a flat, unfolded state such as that illustrated in FIG. 6, the first direction DR1 and the third direction DR3 may be parallel but opposite directions. In that case, an angle between the first direction DR1 and the third direction DR3 may correspond to approximately 180 degrees.

The second pixel area AR2 may be located between the first pixel area AR1 and the third pixel area AR3. Thus, the first pixel area AR1 and the third pixel area AR3 do not contact each other. A folding axis FAX extends across the second pixel area AR2 in the second direction DR2. In an embodiment, the first edge EDG1 and the second edge EDG2 may extend in the second direction DR2 parallel to the folding axis FAX. The second partial image PI2 may be displayed in the second pixel area AR2.

Referring to FIG. 7, the display device 1 is folded to a predetermined angle, such that a display surface DPa is not completely hidden. For example, in FIG. 7, the display device 1 is inwardly folded (i.e., in an in-folded state), so that the first pixel area AR1 and the third pixel area AR3 of the display device 1 are maintained at an angle of about 90 degrees. When folded at the folding axis FAX, the first direction DR1 and the third direction DR3 are not directions opposite to each other. For example, an angle between the first direction DR1 and the third direction DR3 may correspond to an angle less than 180 degrees, e.g., around 90 degrees. For example, in order for a user to use the display device 1 as a foldable laptop computer, the display device 1 may be in-folded, as illustrated in FIG. 7.

Referring to FIG. 8, the display device 1 is fully folded (i.e., in-folded), such that the display surface DPa is in a completely hidden state. For example, in FIG. 8, the first pixel area AR1 is in contact with the third pixel area AR3 such that the angle between the first pixel area AR1 and the third pixel area AR3 of the display device 1 may be about 0 degrees. In this case, in order to reduce unnecessary power consumption, light emission on the display surface DPa may be stopped.

The display device 1 may include a light-emitting element LE and an optical sensor LS on the surface NDPa opposite to the display surface DPa. For example, the light-emitting element LE may be provided for the use of a camera or a flash function. Meanwhile, the optical sensor LS may be provided for the use of an illuminance sensor or a fingerprint sensor.

Figure 9:
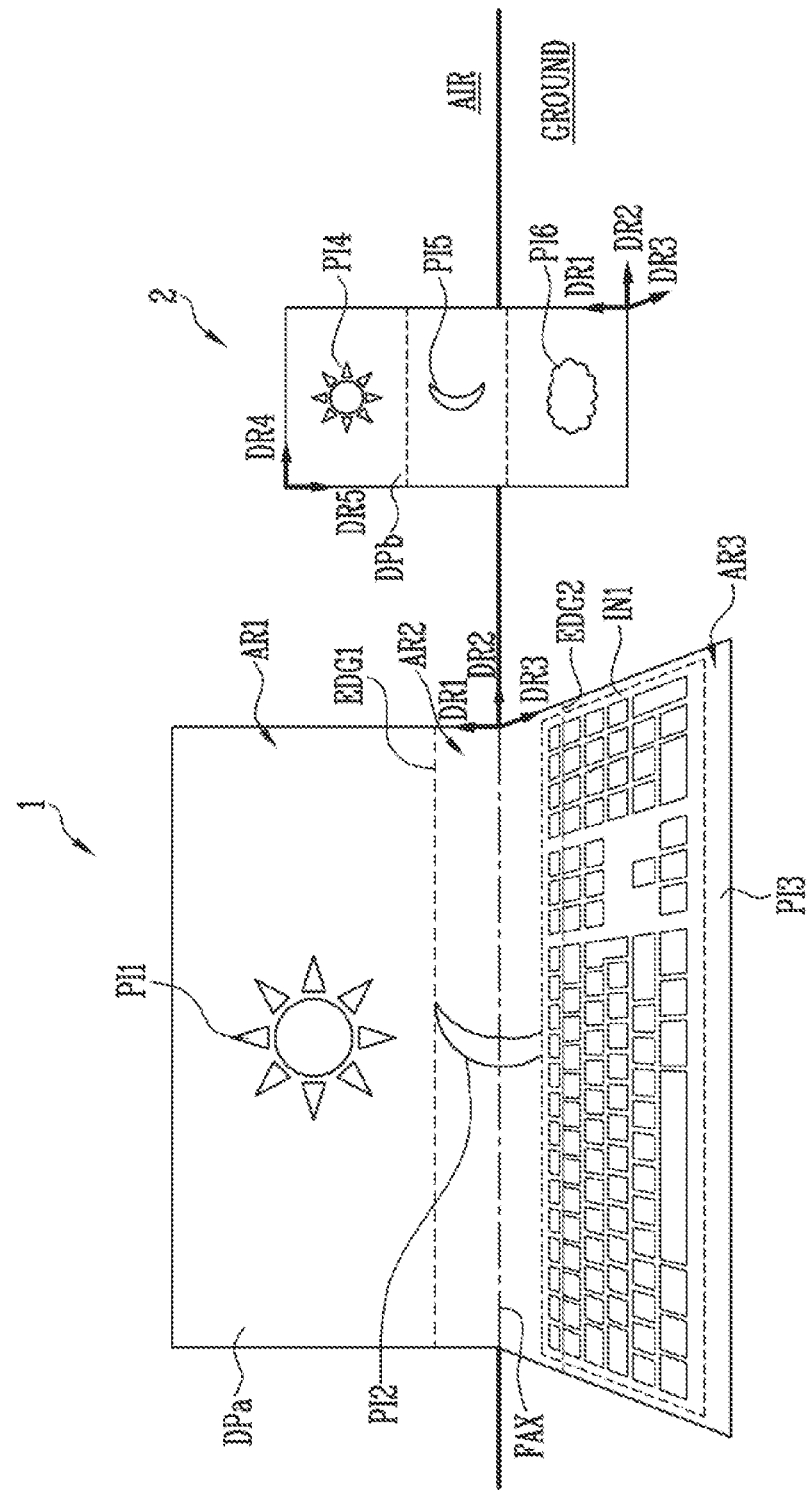
FIGS. 9 and 10 are diagrams illustrating the case where a display surface of a second display device is arranged based on a first direction and a second direction.
Figure 10:
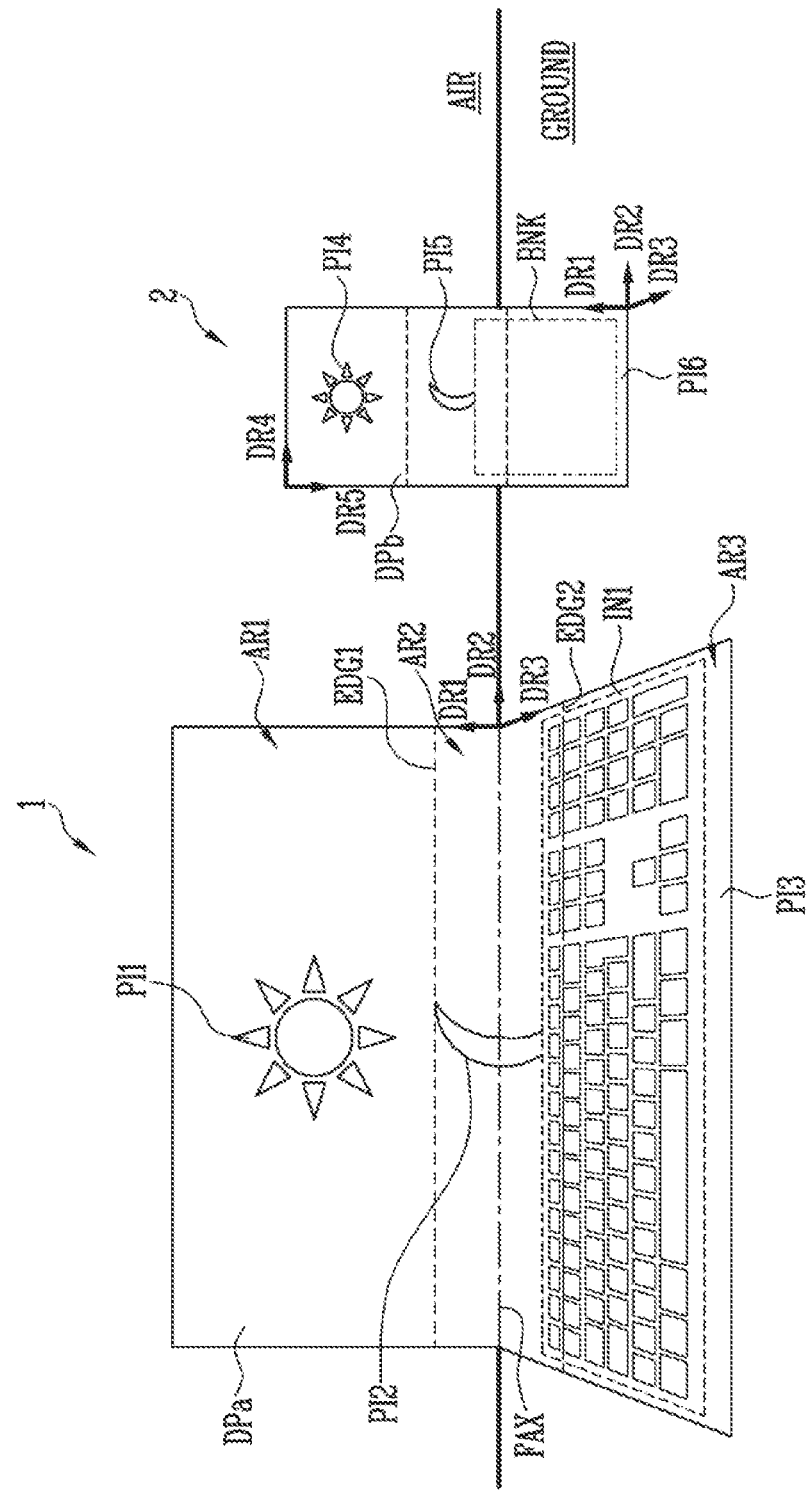

FIGS. 9 and 10 are diagrams illustrating the case where a display surface of a second display device is arranged based on a first direction and a second direction.

The first display device 1 may include the above-described first pixel area AR1, second pixel area AR2, and third pixel area AR3, wherein the first pixel area AR1 may display a first partial image PI1, the second pixel area AR2 may display a second partial image PI2, and the third pixel area AR3 may display a third partial image PI3.

For the user to use the first display device 1 as a foldable laptop computer, the first display device 1 may be in-folded at a predetermined angle, as illustrated in FIG. 7. In this case, the third partial image PI3 may include a first input interface IN1 in an automatic or manual manner. For example, the first input interface IN1 may be a keyboard.

When a first image is displayed, the first partial image PI1 may be displayed farthest away from the ground (e.g., displayed in the air), and the third partial image PI3 is displayed closest to the ground. Alignment directions for these partial images may be determined with reference to the direction information of the above-described direction sensor 18. Accordingly, the first input interface IN1 may be included in the third partial image PI3 such that the first display device 1 does not fall or tip over even if typing is performed by a user.

In FIG. 9 and subsequent drawings, the second partial image PI2 is also illustrated as including a portion of the first input interface IN1. This is only a possible embodiment, and the scope of the present disclosure is not limited thereto. For example, intervals between keys of the first input interface IN1, the sizes of the keys, etc. may be adjusted such that the second partial image PI2 does not include the first input interface IN1 and only the third partial image PI3 includes the first input interface IN1.

A keyboard occupies large space, unlike other input interfaces. In order to utilize the keyboard on the limited real estate of a mobile phone, many different keyboard layouts have been used. However, for optimal typing and work efficiency, a full-size keyboard including 104 keys is often used. Therefore, when the first display device 1 displays the first input interface IN1, it is difficult to display an object (e.g., an icon, a drawing, a letter, etc.), substantially different from the first input interface, in the third partial image PI3. Therefore, it is difficult to utilize the space of the third pixel area AR3.

In the present embodiment, a second display device 2 may display a second image including a fourth partial image PI4 corresponding to the first partial image PI1, a fifth partial image PI5 corresponding to the second partial image PI2, and a sixth partial image PI6 corresponding to the third partial image PI3. Since the configuration of the second display device 2 is the same as the first display device 1, repeated descriptions thereof will be omitted. Although a description will be made on the assumption that the second display device 2 is a flat panel display device, the second display device 2 may be a foldable display device in other embodiments.

It is assumed that the display surface DPb of the second display device 2 has a rectangular shape. The short side of the display surface DPb is defined as extending in a fourth direction DR4, and the long side thereof is defined as extending in a fifth direction DR5.

The first display device 1 may receive first touch input for the first input interface IN1 included in the third partial image PI3. Also, the first display device 1 may receive second touch input for at least one of the fourth partial image PI4, the fifth partial PI5, and the sixth partial image PI6.

The first partial image PI1 and the fourth partial image PI4 may be identical to each other, and the third partial image PI3 and the sixth partial image PI6 may be at least partially different from each other. For example, the sixth partial image PI6 may include an object (e.g., a cloud-shaped icon) different from the first input interface IN1 at a location corresponding to the first input interface IN1.

Therefore, the user may touch the object of the sixth partial image PI6, which is hidden or replaced by the first input interface IN1 on the first display device 1, using the second display device 2. The first display device 1 may entirely utilize the space of the third pixel area AR3 by exploiting first touch input on the first display device 1 and second touch input on the second display device 2.

Further, the user cannot easily touch the first partial image PI1 and the second partial image PI2 of the first display device 1. Because a portion of the first display device 1 which is supported by the ground is only the third pixel area AR3, the first display device 1 may fall backward when the first pixel area AR1 or the second pixel area AR2 is touched. To avoid tipping the display device 1 backward, in accordance with the present embodiment, the effect of touching the first partial image PI1 may be obtained by touching the fourth partial image PI4. The effect of touching the second partial image PI2 may be obtained by touching the fifth partial image PI5. The display device 2 may function like a touchpad with a display capability in some cases.

In an embodiment, the first display device 1 may transmit direction information about the direction in which the first partial image PI1, the second partial image PI2, and the third partial image PI3 are arranged in the second display device 2. In this case, the second display device 2 may determine the direction in which the fourth partial image PI4, the fifth partial image PI5, and the sixth partial image PI6 are to be arranged in the second image, based on the received direction information.

For example, the first partial image PI1, the second partial image PI2, and the third partial image PI3 on the first display device 1 may be aligned based on at least one of the first direction DR1 and the third direction DR3. Here, the fourth partial image PI4, the fifth partial image PI5, and the sixth partial image PI6 on the second display device 2 may be aligned based on at least one of the first direction DR1 and the third direction DR3. For example, the fourth partial image PI4, the fifth partial image PI5, and the sixth partial image PI6 on the second display device 2 may be aligned based on the direction, having a smaller angle with the display surface DPb, between the first direction DR1 and the third direction DR3.

In FIG. 9, the case where the second display device 2 is "standing" on the ground surface with short side down such that the long side and the short side of the display surface DPb of the second display device 2 are parallel to the first direction DR1 and the second direction DR2, respectively (e.g., the vertical mode of the second display device 2), is illustrated. Because an angle between the display surface DPb of the second display device 2 and the first direction DR1 is less than an angle between the display surface DPb and the third direction DR3, the fourth partial image PI4 may be displayed at a location that is further up in the first direction DR1 from the sixth partial image PI6.

Although not illustrated in the drawing, even in the case where the second display device 2 is "standing" on the ground surface with the long side down such that the long side and the short side of the display surface DPb of the second display device 2 are parallel to the second direction DR2 and the first direction DR1, respectively (e.g., the horizontal mode of the second display device 2), an angle between the display surface DPb and the first direction DR1 is less than an angle between the display surface DPb and the third direction DR3, and thus the fourth partial image PI4 may be displayed in the first direction DR1 from the sixth partial image PI6.

Figure 11:
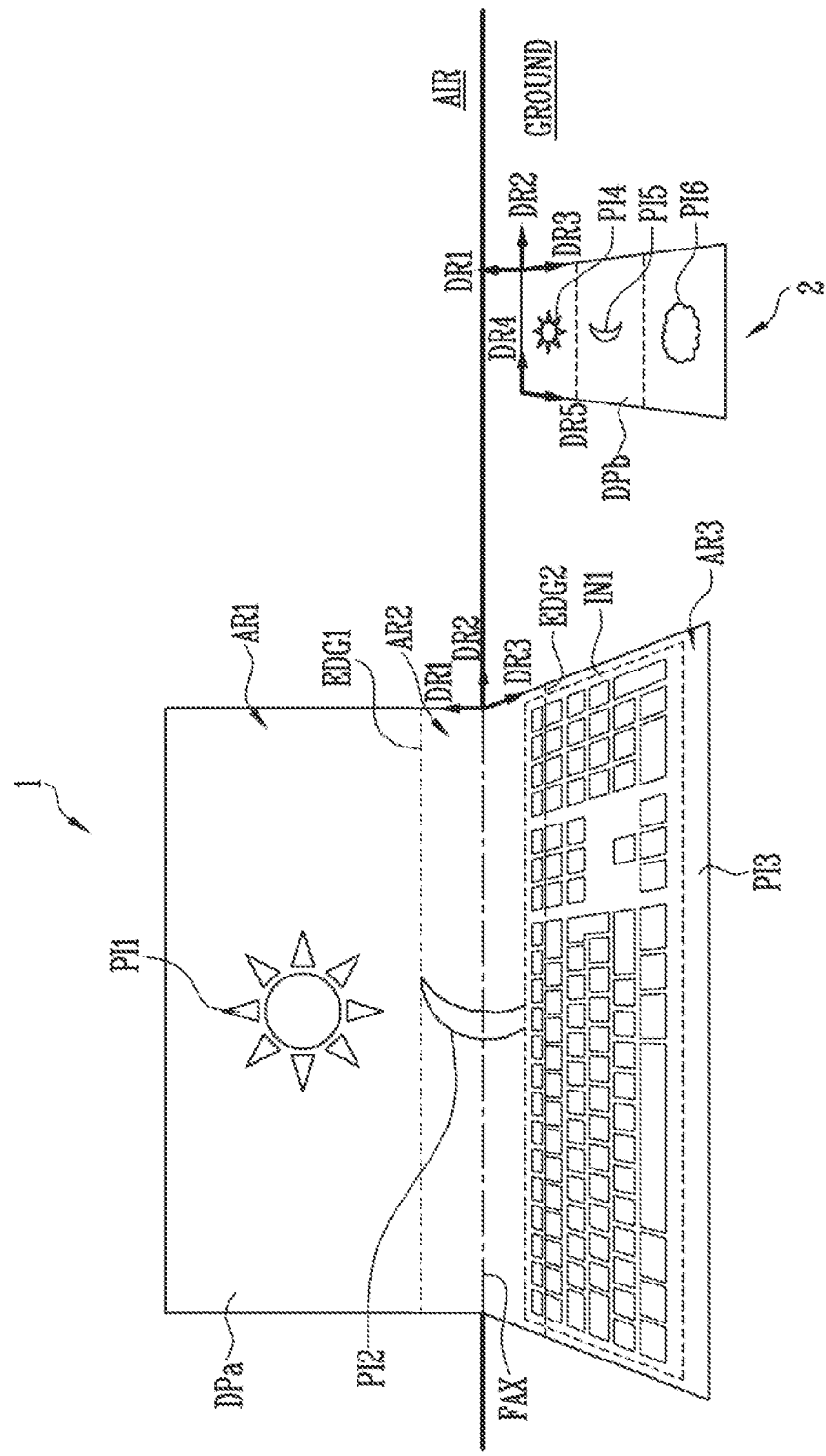
FIGS. 11 and 12 are diagrams illustrating the case where the display surface of the second display device is arranged based on the second direction and a third direction.
Figure 12:
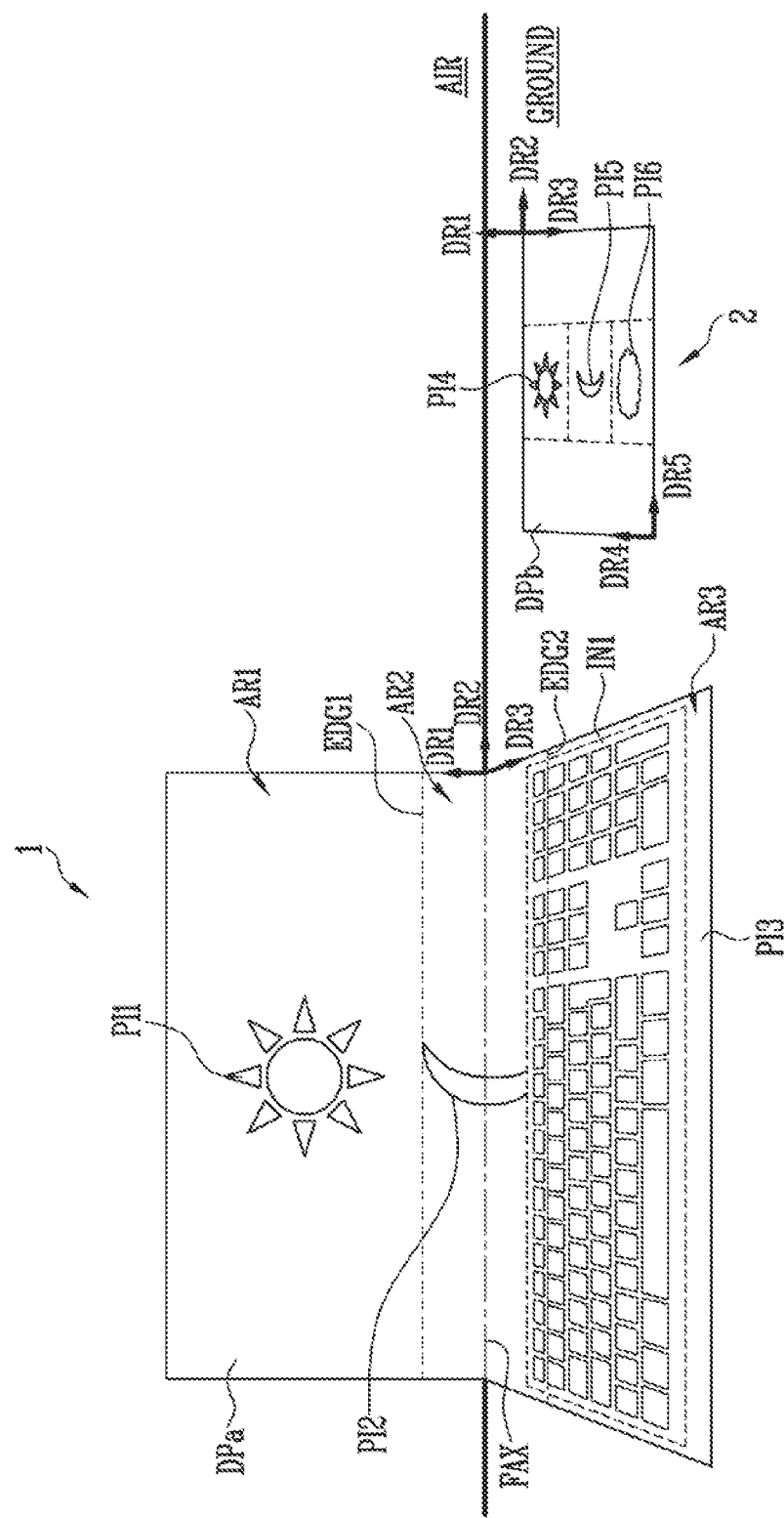

As the second display device 2 switches between the horizontal mode and the vertical mode, the size of the second image changes, but the arrangement direction of the fourth partial image PI4, the fifth partial image PI5, and the sixth partial image PI6 may be maintained (e.g., the fourth partial image PI4 is at the top in either mode). Reference may be made to FIGS. 11 and 12 as drawings similar to those in this process.

Unlike the first display device 1 that is mainly used at a fixed location, the second display device 2 may be used at a frequently changed location. In accordance with the above-described embodiment, second touch input on the second display device 2 may be made with less confusion by the second image of the second display device 2 in a manner identical/similar to the first image on the first display device 1.

Meanwhile, in the embodiment of FIG. 10, the second display device 2 may display a location corresponding to the first input interface IN1 as a blank BNK. In other embodiments, the blank BNK may be translucent, whereby the sixth partial image PI6 may include an object (e.g., a cloud-shaped icon) different from the first input interface IN1 at the location corresponding to the first input interface IN1. The blank BNK in the sixth partial image PI6 may be displayed to indicate the location of the first input interface IN1.

FIGS. 11 and 12 are diagrams illustrating the case where the display surface of the display surface DPb of the second display device 2 is in the plane defined by the second direction DR2 and a third direction DR3.

In FIG. 11, the case where the second display device 2 is arranged such that the long side and the short side of the display surface DPb of the second display device 2 are parallel to the third direction DR3 and the second direction DR2, respectively (e.g., the vertical mode of the second display device 2), is illustrated. Because an angle between the display surface DPb of the second display device 2 and the third direction DR3 is less than an angle between the display surface DPb and the first direction DR1, the sixth partial image PI6 may be displayed in the third direction DR3 from the fourth partial image PI4.

In FIG. 12, the case where the second display device 2 is arranged such that the long side and the short side of the display surface DPb of the second display device 2 are parallel to the second direction DR2 and the third direction DR3, respectively (e.g., the horizontal mode of the second display device 2), is illustrated. Because an angle between the display surface DPb of the second display device 2 and the third direction DR3 is less than an angle between the display surface DPb and the first direction DR1, the sixth partial image PI6 may be displayed in the third direction DR3 from the fourth partial image PI4.

As the second display device 2 switches to the horizontal mode or the vertical mode, the size of the second image changes, but the alignment direction of the fourth partial image PI4, the fifth partial image PI5, and the sixth partial image PI6 may be maintained. Unlike the first display device 1 that is mainly used at a fixed location, the second display device 2 may be moved around and used from a frequently changing location. In accordance with the above-described embodiment, second touch input on the second display device 2 may be more easily made by aligning the second image of the second display device 2 in a manner identical/similar to the first image.

Figure 13:
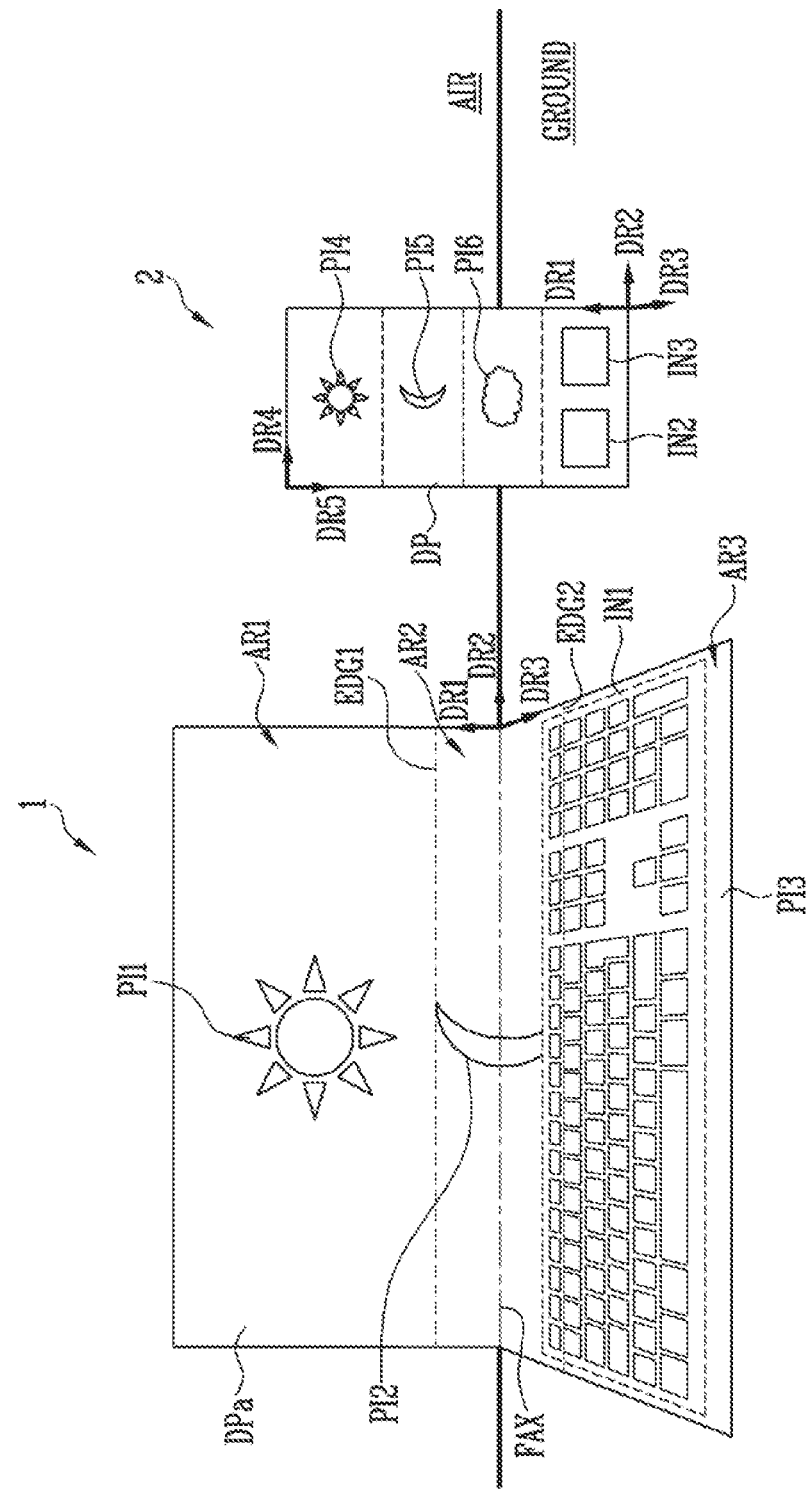
FIG. 13 is a diagram illustrating the case where second and third input interfaces are displayed on the second display device.

FIG. 13 is a diagram illustrating the case where second and third input interfaces are displayed on the second display device.

The second image of the second display device 2 may further include a second input interface IN2 separated from a fourth partial image PI4, a fifth partial image PI5, and a sixth partial image PI6. For example, when the second input interface IN2 is touched, a double-click function or a function of clicking the right mouse button may be performed. Therefore, the first display device 1 may be prevented from tipping over by removing complicated interaction such as double-clicking on the first partial image PI1 and the second partial image PI2.

The second image of the second display device 2 may further include a third input interface IN3 separated from the fourth partial image PI4, the fifth partial image PI5, and the sixth partial image PI6. The third input interface IN3 may also be configured such that a complicated interaction function such as a double-click function or a function of clicking on the right mouse button may be mapped thereto.

Figure 14:
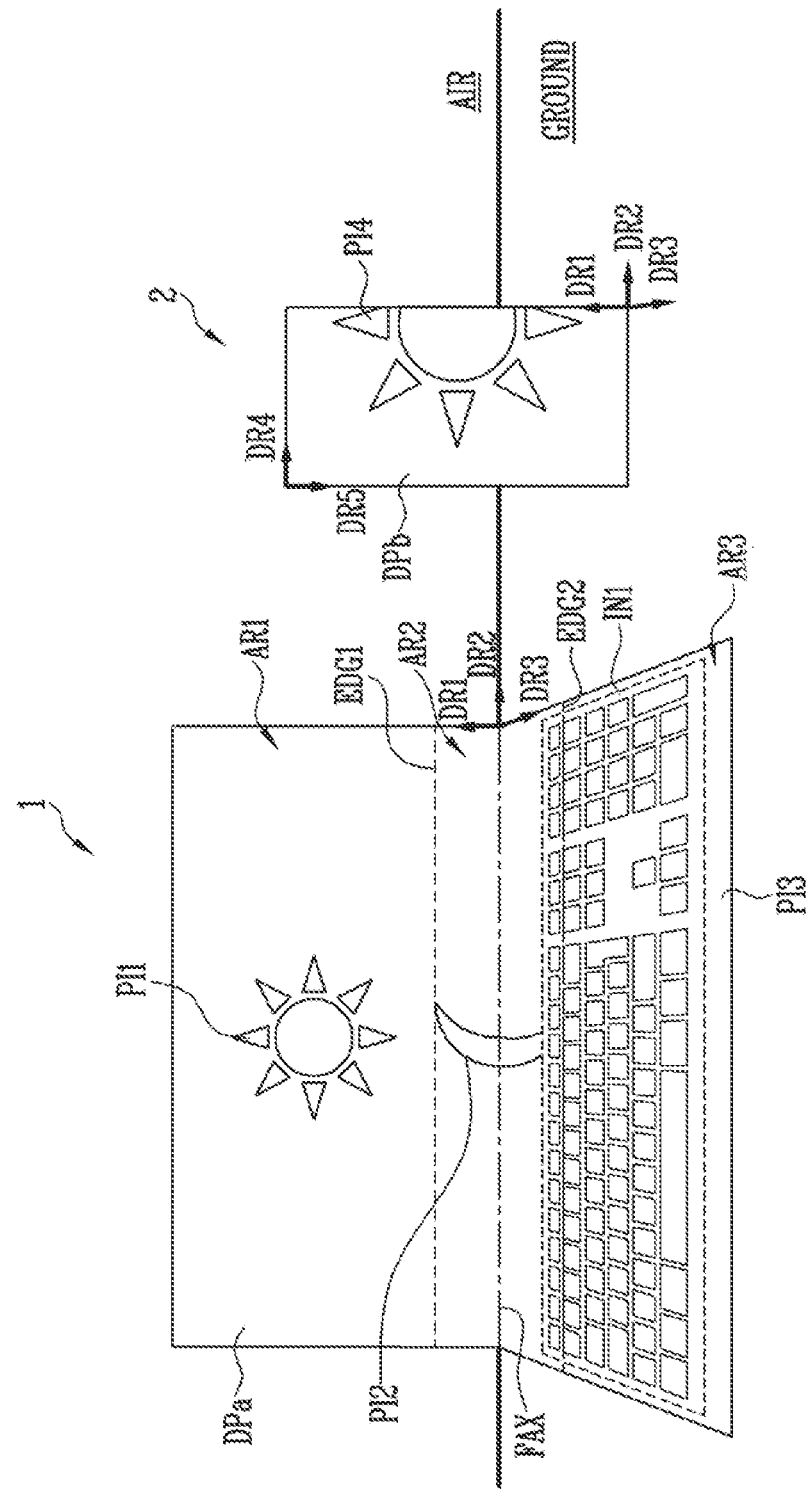
FIG. 14 is a diagram illustrating the case where a fourth partial image is enlarged on the second display device.

FIG. 14 is a diagram illustrating the case where a fourth partial image is enlarged on the second display device.

For example, a user may enlarge the fourth partial image PI4 by making second touch input of enlarging the fourth partial image PI4 (e.g., by moving two fingers away from each other on the fourth partial image PI4). When the second image is enlarged, the size of the first image remains unchanged. Accordingly, a small portion of the first image may be easily zoomed into and viewed through the second image without changing the first image.

Figure 15:
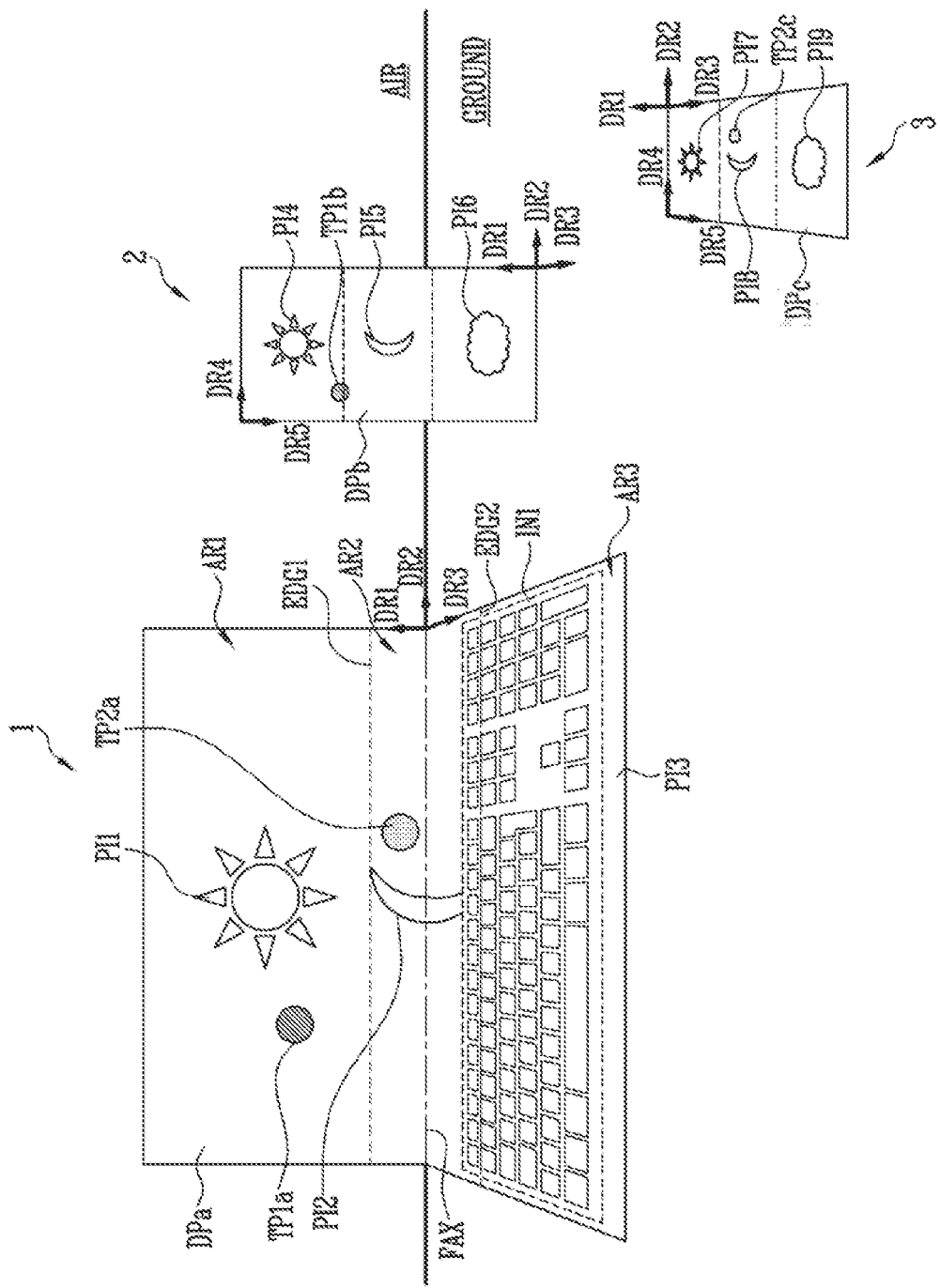
FIG. 15 is a diagram illustrating the case where touch inputs on the second display device and a third display device are simultaneously used.

FIG. 15 is a diagram illustrating the case where touch inputs on a second display device 2 and a third display device 3 are simultaneously used.

The first display device 1 may transmit a third image including a seventh partial image PI7 corresponding to the first partial image PI1, an eighth partial image PI8 corresponding to the second partial image PI2, and a ninth partial image PI9 corresponding to the third partial image PI3 to the third display device 3. Because the configuration of the third display device 3 may be identical/similar to that of the second display device 2, repeated descriptions thereof will be omitted.

The third display device may display the third image, and the user may perform third touch input for the third image. The first display device 1 may receive third touch input for at least one of the seventh partial image PI7, the eighth partial image PI8, and the ninth partial image PI9.

In accordance with the present embodiment, two or more users may simultaneously manipulate the first display device 1 using the second display device 2 and the third display device 3. This manipulation is useful especially in the situation in which a simultaneous task is required such as for cooperation in a game environment.

In accordance with an embodiment, the first display device 1 may display a first point object TP1*a* corresponding to second touch input TP1*b*. Further, the first display device 1 may also display a second point object TP2*a* corresponding to third touch input TP2*c*.

In an embodiment, the second touch input TP1*b* may be displayed as a point object on the second display device 2. Meanwhile, the third touch input TP2*c* may be displayed as a point object on the third display device 3.

In accordance with the above-described embodiments, the first point object TP1a and the second point object TP2a may act as the crosshairs in a game environment, thus helping the user fire an aimed shot.

In other embodiments, the number of external display devices that are configured may be 3 or more.

FIG. 16 is a diagram illustrating the case where the second display device is used as a mouse.

As described above with reference to FIG. 8, a light-emitting element LE and an optical sensor LS may be included in a surface NDPa opposite to the display surface DPa. The second display device 2 may function as a mouse in such a way that the light-emitting element LE emits light and the optical sensor LS receives reflected light. Here, the display surface DPb of the second display device 2 may include a second input interface IN2 for performing a function of clicking the left mouse button, a fourth input interface IN4 for performing a function of a wheel button, and a third input interface IN3 for performing a function of clicking the right mouse button. The second display device 2 may not display a second image corresponding to a first image. The reason for this is that, when the second display device 2 is used as the mouse, the display surface DPb is hidden by the palm of the user, thus making it difficult to identify an image on the display surface DPb and causing malfunction. A cursor CRS may be displayed on the first display device 1 to correspond to the location of the second display device 2.

FIG. 17 is a diagram illustrating an embodiment in which the second display device is used.

Referring to FIG. 17, the second display device 2 may further display a tenth partial image PI10 in addition to fourth to sixth partial images PI4, PI5, and PI6. The tenth partial image PI10 may be an independent partial image internally generated by the second display device 2, rather than being received from the first display device 1.

For example, the tenth partial image PI10 may be a partial image indicating the application of the second display device 2, such as a messenger or a web page. Therefore, although the image of the first display device 1 is displayed as fourth to sixth partial images PI4, PI5, and PI6, the user may manipulate the independent application of the second display device 2 simultaneously with the displaying of the image.

For example, in FIG. 17, the tenth partial image PI10 is located in a fifth direction DR5 from the sixth partial image PI6. However, the location of the tenth partial image PI10 is not limited by FIG. 17. For example, the tenth partial image PI10 may be located in a direction opposite the fifth direction DR5 from the fourth partial image PI4.

Among the above-described embodiments, the method of controlling a plurality of display devices may be implemented as a computer program, an application on a mobile phone, or the like. Therefore, a device such as the computer or the mobile phone reads a storage medium in which data, a program, an application or the like related to the control method is stored, and thus the above-described embodiments may be implemented.

The storage medium may include all types of recording devices in which the data or program readable by the computer system can be stored. Examples of the computer-readable storage medium may include a read only memory (ROM), a random access memory (RAM), a compact disc ROM (CD-ROM), magnetic tape, a floppy disk, an optical data storage device, a hard disk, an external hard disk, a solid state drive (SSD), a universal serial bus (USB) storage device, a digital versatile disk (DVD), and a Blu-ray disk.

Further, the computer-readable storage medium may be a combination of a plurality of devices, or may be distributed over computer systems coupled to each other over a network. Such a storage medium may be a non-transitory computer readable medium. The non-transitory computer-readable medium refers to a medium which semi-permanently stores data or programs and is readable by a computer, rather than a medium which stores data or programs for a short period of time, such as a register, a cache, or a memory.

A display device and a method of controlling a plurality of display devices according to the present disclosure may enable user input to be made on a foldable and touchable display device without inconvenience.

The drawings that have been referred to and the detailed description of the present disclosure are merely examples of the present disclosure, and are only intended to describe the present disclosure, not limit meanings or restrict the scope of the present disclosure described in the claims. Therefore, it will be appreciated to those skilled in the art that various modifications and other embodiments may be implemented from those embodiments. Accordingly, the scope of the present disclosure should be defined by the technical spirit of the accompanying claims.

What is claimed is:

1. A plurality of display devices comprising:
   a first display device including a first pixel area displaying a first partial image, a second pixel area displaying a second partial image, and a third pixel area displaying a third partial image; and
   a second display device including a fourth pixel area displaying a fourth partial image corresponding to the first partial image, a fifth pixel area displaying a fifth partial image corresponding to the second partial image, and a sixth pixel area displaying a sixth partial image corresponding to the third partial image,
   wherein the second pixel area is a foldable area and between the first pixel area and the third pixel area,
   wherein the fifth pixel area is between the fourth pixel area and the sixth pixel area,
   wherein at least one of the first pixel area and the third pixel area displays a first input interface configured to receive a first touch input, and
   wherein the first display device is configured to receive a second touch input through the second display device, the second touch input corresponding to at least one of the fourth partial image, the fifth partial image, and the sixth partial image.

2. The plurality of display devices of claim 1,
   wherein the second pixel area displays at least a portion of the first input interface.

3. The plurality of display devices of claim 1,
   wherein the first partial image and the fourth partial image are identical to each other, and
   wherein the third partial image and the sixth partial image are at least partially different from each other.

4. The plurality of display devices of claim 3,
   wherein the third partial image includes at least a portion of the first input interface, and
   wherein the sixth partial image includes an object different from the first input interface at a location corresponding to the first input interface.

5. The plurality of display devices of claim 4,
   wherein the first input interface is a keyboard.

6. The plurality of display devices of claim 4,
   wherein the third pixel area is located closer to a ground than the first pixel area.

7. The plurality of display devices of claim 1,
wherein the first display device further comprises a transceiver configured to receive the second touch input different from the first touch input from the second display device.

8. The plurality of display devices of claim 7,
wherein the transceiver is further configured to transmit a second image including the fourth partial image, the fifth partial image, and the sixth partial image to the second display device.

9. The plurality of display devices of claim 8,
wherein the first display device further comprises a direction sensor configured to provide direction information about a direction in which the first partial image, the second partial image, and the third partial image are arranged, and
wherein the transceiver further transmits the direction information to the second display device.

10. The plurality of display devices of claim 1,
wherein the first display device further comprises a sensor including a first sensing area configured to at least partially overlap the first pixel area, a second sensing area configured to at least partially overlap the second pixel area, and a third sensing area configured to at least partially overlap the third pixel area, and configured to receive the first touch input.

11. A method of controlling a plurality of display devices, comprising:
displaying, on a first display device, a first image including a first partial image, a second partial image, and a third partial image, the third partial image including a first input interface;
displaying, on a second display device, a second image including a fourth partial image corresponding to the first partial image, a fifth partial image corresponding to the second partial image, and a sixth partial image corresponding to the third partial image;
receiving, by the first display device, a first touch input on the first input interface; and
receiving, by the first display device, a second touch input on at least one of the fourth partial image, the fifth partial image, and the sixth partial image.

12. The method according to claim 11, further comprising:
transmitting, by the first display device, the second image to a second display device.

13. The method according to claim 12, further comprising:
transmitting, by the first display device, direction information about a direction in which the first partial image, the second partial image, and the third partial image are arranged on the first display device; and
causing the second display device to determine a direction in which the fourth partial image, the fifth partial image, and the sixth partial image are arranged in the second image based on the direction information.

14. The method according to claim 13, wherein, when the second display device switches to a horizontal mode or a vertical mode, a size of the second image changes, but the direction in which the fourth partial image, the fifth partial image, and the sixth partial image are arranged is unchanged.

15. The method according to claim 11, wherein:
displaying the first image comprises displaying the first partial image on a plane defined by a first direction and a second direction and displaying the third partial image on a plane defined by the second direction and a third direction, and
displaying the second image comprises displaying the fourth partial image in the first direction from the sixth partial image both in cases where a long side and a short side of a display surface of the second display device are parallel to the first direction and the second direction, respectively, and where the long side and the short side are parallel to the second direction and the first direction, respectively.

16. The method according to claim 15, wherein displaying the second image is configured to display the sixth partial image in the third direction from the fourth partial image both in cases where the long side and the short side are parallel to the second direction and the third direction, respectively, and where the long side and the short side are parallel to the third direction and the second direction, respectively.

17. The method according to claim 11, wherein:
the first partial image and the fourth partial image are identical to each other, and
the third partial image and the sixth partial image are at least partially different from each other.

18. The method according to claim 11, wherein the sixth partial image includes an object different from the first input interface at a location corresponding to the first input interface.

19. The method according to claim 11, wherein displaying the first image is configured to display the first partial image farthest away from a ground and display the third partial image closest to the ground.

20. The method according to claim 11, wherein the second image includes a second input interface separated from the fourth partial image, the fifth partial image, and the sixth partial image.

21. The method according to claim 20, wherein, when the second input interface is touched, a double-click function or a right-click function of a mouse button is performed.

22. The method according to claim 11, wherein, when the second image is enlarged, a size of the first image is unchanged.

23. The method according to claim 11, further comprising:
transmitting, by the first display device, a third image including a seventh partial image corresponding to the first partial image, an eighth partial image corresponding to the second partial image, and a ninth partial mage corresponding to the third partial image to a third display device;
displaying, by the third display device, the third image; and
receiving, by the first display device, a third touch input for at least one of the seventh partial image, the eighth partial image, and the ninth partial image.

24. The method according to claim 23, further comprising:
displaying, by the first display device, a first point object corresponding to the second touch input; and
displaying, by the first display device, a second point object corresponding to the third touch input.

* * * * *